US012790494B2

(12) United States Patent
Bauer et al.

(10) Patent No.: US 12,790,494 B2
(45) Date of Patent: Nov. 10, 2026

(54) EFFECT PIGMENTS

(71) Applicant: SUSONITY COMMERCIAL GMBH, Gernsheim (DE)

(72) Inventors: Johann Bauer, Gernsheim (DE); Andrea Heyland, Gernsheim (DE)

(73) Assignee: SUSONITY COMMERCIAL GMBH, Gernsheim (DE)

( * ) Notice: Subject to any disclaimer, the term of this patent is extended or adjusted under 35 U.S.C. 154(b) by 355 days.

(21) Appl. No.: 18/543,585

(22) Filed: Dec. 18, 2023

(65) Prior Publication Data

US 2024/0199886 A1 Jun. 20, 2024

(30) Foreign Application Priority Data

Dec. 19, 2022 (EP) .................................... 22214502

(51) Int. Cl.

*C09C 1/36* (2006.01)
*C09C 1/00* (2006.01)
*C09D 5/36* (2006.01)
*C09D 7/40* (2018.01)

(52) U.S. Cl.

CPC .......... *C09C 1/3653* (2013.01); *C09C 1/0015* (2013.01); *C09D 5/36* (2013.01); *C09D 7/70* (2018.01); *C09C 2200/1004* (2013.01); *C09C 2200/401* (2013.01); *C09C 2200/402* (2013.01)

(58) Field of Classification Search

CPC ................ C09C 1/3653; C09C 1/0015; C09C 2200/1004; C09C 2200/401; C09C 2200/402; C09C 2200/205; C09C 2200/302; C09C 1/0021; C09C 2200/102; C09C 2220/106; C09C 1/0024; C09C 3/006; C09C 3/063; C09D 5/36; C09D 7/70; C01P 2006/40; C01P 2006/62; C01P 2006/63; C01P 2006/64; C01P 2002/52

See application file for complete search history.

(56) References Cited

U.S. PATENT DOCUMENTS

| | | | |
|---|---|---|---|
| 3,087,828 | A | 4/1963 | Linton |
| 3,087,829 | A | 4/1963 | Linton |
| 3,553,001 | A | 1/1971 | Kohlschutter et al. |
| 3,832,208 | A | 8/1974 | Jackson |
| 3,874,890 | A | 4/1975 | Bernhard et al. |
| 3,926,659 | A | 12/1975 | Bernhard et al. |
| 4,086,100 | A | 4/1978 | Esselborn et al. |
| 4,344,987 | A | 8/1982 | Ostertag et al. |
| 4,456,486 | A | 6/1984 | Bernhard |
| 4,457,784 | A | 7/1984 | Bernhard |
| 4,482,389 | A | 11/1984 | Franz et al. |
| 4,490,179 | A | 12/1984 | Bernhard |
| 4,494,993 | A | 1/1985 | Bernhard et al. |
| 4,509,988 | A | 4/1985 | Bernhard |
| 4,537,636 | A | 8/1985 | Bernhard et al. |
| 4,544,415 | A | 10/1985 | Franz et al. |
| 4,552,593 | A | 11/1985 | Ostertag |
| 4,565,581 | A | 1/1986 | Bernhard |
| 4,623,396 | A | 11/1986 | Kimura et al. |
| 5,472,491 | A | 12/1995 | Duschek et al. |
| 5,571,851 | A | 11/1996 | Freeman et al. |
| 5,759,255 | A | 6/1998 | Venturini et al. |
| 6,019,831 | A | 2/2000 | Schmidt et al. |
| 6,176,918 | B1 | 1/2001 | Glausch et al. |
| 6,238,472 | B1 | 5/2001 | Andes et al. |
| 6,417,250 | B2 | 7/2002 | Kieser et al. |
| 6,689,205 | B1 | 2/2004 | Brückner et al. |
| 6,761,762 | B1 | 7/2004 | Greiwe et al. |

FOREIGN PATENT DOCUMENTS

| | | | |
|---|---|---|---|
| DE | 1467468 | A1 | 12/1968 |
| DE | 1 959 988 | A1 | 6/1971 |
| DE | 2 009 566 | B1 | 11/1971 |
| DE | 2 214 545 | A1 | 10/1972 |
| DE | 2 215 191 | A1 | 10/1972 |
| DE | 2 244 298 | A1 | 3/1974 |
| DE | 2 313 331 | A1 | 9/1974 |
| DE | 25 22 572 | A1 | 12/1976 |
| DE | 31 37 808 | A1 | 3/1983 |
| DE | 31 37 809 | A1 | 3/1983 |
| DE | 31 51 343 | A1 | 7/1983 |
| DE | 31 51 354 | A1 | 7/1983 |
| DE | 31 51 355 | A1 | 7/1983 |
| DE | 32 11 602 | A1 | 10/1983 |
| DE | 32 35 017 | A1 | 3/1984 |
| DE | 33 34 598 | A1 | 4/1985 |
| DE | 39 29 423 | A1 | 3/1991 |
| DE | 43 17 019 | A1 | 12/1993 |
| DE | 196 18 568 | A1 | 11/1997 |
| DE | 196 18 569 | A1 | 11/1997 |
| EP | 0 045 851 | A1 | 2/1982 |
| EP | 0 090 259 | A1 | 10/1983 |

(Continued)

OTHER PUBLICATIONS

Glausch et al., "Perlglanzpigmente [Pearlescent Pigments]", Die Technologie des Beschichtens, (Month unknown 1996), pp. 82-119. (21 pages total).
Harding et al., "The Role of Adhesion in the Mechanical Properties of Filled Polymer Composites", Journal of Adhesion Science and Technology, (Month unknown 1997), vol. 11, No. 4, pp. 471-493.
Kelly et al., "Wet-chemical Etching of III-V Semiconductors", Philips Technical Review, (Jul. 14, 1988), vol. 44, No. 3, pp. 61-100.
The extended European Search Report issued Apr. 8, 2024, by the European Patent Office in corresponding European Patent Application No. 23205532.7-1014 and an English machine translation of the extended European Search Report. (10 pages).

*Primary Examiner* — Anthony J Green
(74) *Attorney, Agent, or Firm* — Buchanan Ingersoll & Rooney PC

(57) ABSTRACT

Opaque fluoride-doped effect pigments having a metallic lustre based on flake-form substrates, and a process for the preparation of these pigments, and the use thereof, in particular in automotive paints and cosmetic formulations.

16 Claims, 1 Drawing Sheet

(56) References Cited

FOREIGN PATENT DOCUMENTS

| | | | |
|---|---|---|---|
| EP | 0 106 235 | A1 | 4/1984 |
| EP | 0 141 174 | A1 | 5/1985 |
| EP | 0 268 918 | A1 | 6/1988 |
| EP | 0 342 533 | A1 | 11/1989 |
| EP | 0 465 805 | A2 | 1/1992 |
| EP | 0 492 223 | A2 | 7/1992 |
| EP | 0 632 109 | A1 | 1/1995 |
| EP | 0 634 459 | A2 | 1/1995 |
| EP | 0 659 843 | A2 | 6/1995 |
| GB | 1 287 225 | A | 8/1972 |
| GB | 1 359 933 | A | 7/1974 |
| WO | 93/19131 | A1 | 9/1993 |
| WO | 96/32446 | A1 | 10/1996 |
| WO | 98/13426 | A1 | 4/1998 |
| WO | 99/57204 | A1 | 11/1999 |
| WO | 01/92425 | A2 | 12/2001 |

Definition of the angles in the multiangle spectrophotometer
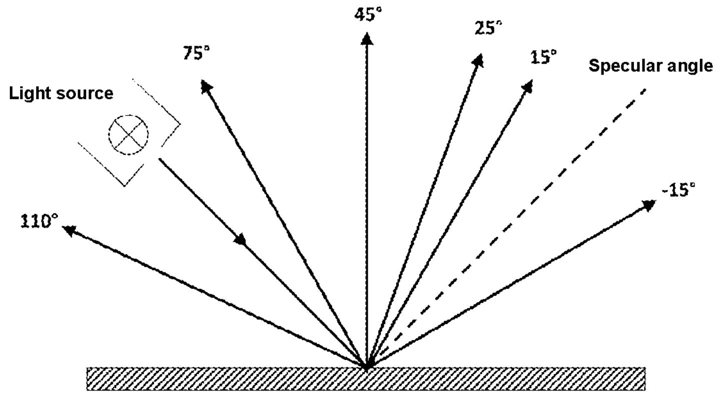

EFFECT PIGMENTS

CROSS-REFERENCE TO RELATED APPLICATIONS

This application is a U.S. national application filed under 35 U.S.C. § 111, claiming priority under 35 U.S.C. § 119 of EP Application No. 22214502.1, filed Dec. 19, 2022, the entire disclosure of which is incorporated herein by reference in its entirety and for all purposes.

BACKGROUND

The present invention relates to opaque fluoride-doped effect pigments having a metallic lustre based on flake-form substrates, and to a process for the preparation of these pigments, and to the use thereof, in particular in automotive paints and cosmetic formulations.

In the automobile sector, in the colouring of plastics, in cosmetics, but also in the printing sector, use is increasingly being made of effect pigments, which are intended to impart a particular lustre or particular colour effect on the products pigmented therewith. In general, the effect pigments are substrates, for example comprising metals, mica or synthetic flakes of $SiO_2$, glass or $Al_2O_3$, which are coated with one or more layers, for example comprising metals or metal oxides. Metal oxides in particular are frequently used layer materials since they can be applied to the substrates by precipitation and are chemically very substantially inert.

Pigments having novel and interesting colour effects are obtained, inter alia, by the reduction of metal oxide layers in interference pigments. The reducing agents employed are preferably hydrogen, ammonia, carbon, carbon monoxide, hydrocarbons, non-metal hydrides, such as, for example, $NaBH_4$, or metals.

Thus, for example, WO 93/19131 describes the reductive calcination of $TiO_2$-coated flake-form substrates using solid reducing agents in a non-oxidising atmosphere. In this process, a layer structure is formed which contains gradually more Ti oxides towards the substrate and gradually more atoms of the reducing agents employed towards the outside, so long as the reducing agents can be integrated into the titanium oxide structure or stay at the grain boundaries of the titanium oxide crystallites.

U.S. Pat. No. 4,623,396 discloses the reduction of $TiO_2$/mica pigments in the presence of reducing gas mixtures, where mica flakes are coated with two layers which lie one above the other and consist of titanium compounds, where the second layer located on the first layer consists of $TiO_2$ and the first layer located directly on the mica particles consists of a titanium compound, such as, for example, lower titanium oxides, titanium oxynitride, or a mixture of titanium compounds with $TiO_2$. The outer $TiO_2$ layer is formed by subsequent heating under oxidising conditions, so that a layer of $TiO_2$ forms on the $TiO_{2-x}$ from the outside.

An essential disadvantage of the effect pigments known from the prior art prepared under reducing conditions are the inhomogeneous calcination results and thus the reproducibility of the pigments. A further disadvantage is the use of solid reducing agents, which leads to contamination of the layer reduced therewith, and causes undesired changes in the colour effects that are actually desired. Reduction using metals is also disadvantageous since in this way an additional component is introduced into the coating, which can likewise lead to undesired changes in the properties of the pigments.

SUMMARY

The object of the present invention is therefore to prepare reproducible opaque effect pigments having a metallic lustre which do not have the above-mentioned disadvantages and are at the same time transparent to electromagnetic radiation.

Surprisingly, it has been found that effect pigments comprising at least one fluoride-doped titanium dioxide layer which has been calcined under reducing conditions have a metallic lustre and, in contrast to aluminium pigments, are transparent to electromagnetic radiation. The pigments according to the invention can be prepared easily and reproducibly and have a significantly increased hiding power compared with the starting pigments.

The present invention relates to an effect pigment based on a flake-form substrate, characterised in that it comprises at least one $TiO_2$ layer in which the $TiO_2$ has been doped with $Ti^{III+}$ and fluoride.

The effect pigments according to the invention exhibit a darker mass tone than the starting pigments and a usually blueish metallic lustre and are transparent to electromagnetic radiation.

The invention also relates to the use of the pigments according to the invention in inks, powder coatings, paints, in particular automotive paints and radar-transparent finishes and electrostatically dissipative formulations, in printing inks, security printing inks, plastics, as absorbers for laser marking and laser welding, in cosmetic formulations and in particular for high-temperature applications, such as, for example, for the pigmentation of glazes and ceramics. The pigments according to the invention are furthermore also suitable for the preparation of pigment preparations and for the preparation of dry preparations, such as, for example, ceramic colours, granules, chips, pellets, briquettes, etc.

BRIEF DESCRIPTION OF THE DRAWINGS

FIG. 1 illustrates various defined angles from a light source using a multi-angle spectrophotometer.

DETAILED DESCRIPTION

Suitable base substrates for the effect pigments according to the invention are semi-transparent and transparent flake-form substrates. Preferred substrates are phyllosilicate flakes, SiC flakes, TiC flakes, WC flakes, $B_4C$ flakes, BN flakes, graphite flakes, $TiO_2$ flakes and $Fe_2O_3$ flakes, doped or undoped $Al_2O_3$ flakes, doped or undoped glass flakes, doped or undoped $SiO_2$ flakes, $TiO_2$ flakes, BiOCl and mixtures thereof. From the group of the phyllosilicates, particular preference is given to natural and synthetic mica flakes, muscovite, talc and kaolin. The synthetic mica used as substrate is preferably fluorophlogopite or Zn phloglopite. The pigments according to the invention are preferably based on substrates selected from the group synthetic or natural mica flakes, phyllosilicates, glass flakes, borosilicate flakes, $SiO_2$ flakes, $Al_2O_3$ flakes, $TiO_2$ flakes, graphite flakes, and/or BiOCl flakes.

The glass flakes can consist of all types of glass known to the person skilled in the art, so long as they are temperature-stable in the firing range used. Suitable glasses are, for example, quartz glass, A glass, E glass, C glass, ECR glass, used glass, alkali borate glass, alkali silicate glass, borosilicate glass, DuranR glass, labware glass or optical glass.

The refractive index of the glass flakes is preferably 1.45-1.80, in particular 1.50-1.70. The glass substrates particularly preferably consist of C glass, ECR glass or borosilicate glass.

Synthetic substrate flakes, such as, for example, glass flakes, $SiO_2$ flakes, $Al_2O_3$ flakes, may be doped or undoped. If they are doped, the doping is preferably Al, N, B, Ti, Zr, Si, In, Sn or Zn or mixtures thereof. Furthermore, further ions from the group of the transition metals (V, Cr, Mn, Fe, Co, Ni, Cu, Y, Nb, Mo, Hf, Sb, Ta, W) and ions from the group of the lanthanides can serve as dopants.

In the case of $Al_2O_3$, the substrate is preferably undoped or doped with $TiO_2$, $ZrO_2$ or ZnO. The $Al_2O_3$ flakes are preferably corundum. Suitable $Al_2O_3$ flakes are preferably doped or undoped $\alpha$-$Al_2O_3$ flakes, in particular $\alpha$-$Al_2O_3$ flakes doped with $TiO_2$ or $ZrO_2$.

If the substrate is doped, the proportion of doping is preferably 0.01-5% by weight, in particular 0.1-3% by weight, based on the substrate.

The size of the base substrates is not crucial per se and can be matched to the particular application. In general, the flake-form substrates have a thickness between 0.05 and 5 μm, in particular between 0.1 and 4.5 μm.

It is also possible to employ substrates of different particle sizes. Particular preference is given to a mixture of mica fractions of mica N (10-60 μm), mica F (5-20 μm) and/or mica M (<15 μm). Preference is furthermore given to N and S fractions (10-130 μm) and F and S fractions (5-130 μm).

Typical examples of particle size distributions (measured using Malvern Mastersizer 3000):

$D_{10}$: 1-50 μm, in particular 2-45 μm, very particularly preferably 5-40 μm $D_{50}$: 7-275 μm, in particular 10-200 μm, very particularly preferably 15-150 μm $D_{90}$: 15-500 μm, in particular 25-400 μm, very particularly preferably 50-200 μm.

In this patent application, "high-refractive-index" means a refractive index of ≥1.8, while "low-refractive-index" means a refractive index of <1.8.

The flake-form substrates are preferably completely enveloped with one or more layers.

In a preferred embodiment, the support of the effect pigment can be coated with one or more transparent, semi-transparent and/or opaque layers comprising metal oxides, metal oxide hydrates, metal suboxides, metals, metal fluorides, metal nitrides, metal oxynitrides or mixtures of these materials. The metal oxide, metal oxide hydrate, metal suboxide, metal, metal fluoride, metal nitride, metal oxynitride layers or the mixtures thereof can be low refractive index (refractive index<1.8) or high refractive index (refractive index≥1.8). Suitable metal oxides and metal oxide hydrates are all metal oxides or metal oxide hydrates known to the person skilled in the art, such as, for example, aluminium oxide, aluminium oxide hydrate, silicon oxide, silicon oxide hydrate, iron oxide, tin oxide, cerium oxide, zinc oxide, zirconium oxide, chromium oxide, titanium oxide, in particular titanium dioxide, titanium oxide hydrate and mixtures thereof, such as, for example, Fe/Ti mixed oxides. Metal suboxides which can be employed are, for example, the titanium suboxides. A suitable metal fluoride is, for example, magnesium fluoride. Metal nitrides or metal oxynitrides which can be employed are, for example, the nitrides or oxynitrides of the metals titanium, silicon, zirconium and/or tantalum. Preferably, metal oxide, metal, metal fluoride and/or metal oxide hydrate layers and very particularly preferably metal oxide and/or metal oxide hydrate layers are applied to the support. Furthermore, more, multilayered structures comprising high- and low-refractive-index metal oxide, metal oxide hydrate, metal or metal fluoride layers may also be present, with high- and low-refractive-index layers preferably alternating. Particular preference is given to layer packages comprising a high-refractive-index layer and a low-refractive-index layer, where one or more of these layer packages may be applied to the support. The sequence of the high- and low-refractive-index layers can be matched to the support in order to incorporate the support into the multilayered structure. In a further embodiment, the metal oxide, metal silicate, metal oxide hydrate, metal suboxide, metal, metal fluoride, metal nitride, metal oxynitride layers can be mixed or doped with colourants, so long as they are stable in the reduction process.

A high-refractive-index layer having a refractive index of n≥1.8, preferably n≥2.0, preferably comprises metal oxides selected from the group $TiO_2$, $ZrO_2$, ZnO, $SnO_2$, $Cr_2O_3$, $Ce_2O_3$, BiOCl, $Fe_2O_3$, Fe304, FeO(OH), Ti suboxides (partially reduced $TiO_2$ with oxidation states from <4 to 2 and lower oxides, such as, for example, $Ti_3O_5$, $Ti_2O_3$ up to TiO), titanium oxynitrides and titanium nitride, alkaline-earth metal titanates $MTiO_3$ (M=Ca, Sr, Ba), CoO, $CO_2O_3$, $CO_3O_4$, $VO_2$, $V_2O_3$, NiO, $WO_3$, MnO, $Mn_2O_3$ or mixtures of the said oxides.

A low-refractive-index layer having a refractive index of n<1.8, preferably n<1.7, preferably comprises metal oxides selected from the group $SiO_2$, $MgO*SiO_2$, $CaO*SiO_2$, $Al_2O_3*SiO_2$, $B_2O_3*SiO_2$ or or a mixture of the said compounds. Furthermore, the silicate layer may be doped with further alkaline-earth metal or alkali metal ions.

Suitable colourants or other elements are, for example, inorganic coloured pigments, such as coloured metal oxides, for example magnetite, chromium(III) oxide or coloured pigments, such as, for example, Thenard's Blue (a Co—Al spinel) or elements, such as, for example, yttrium or antimony, and generally pigments from the structural class of the perovskites, pyrochlores, rutiles and spinels, so long as they are stable at the reduction temperatures. Pearlescent pigments comprising these layers exhibit high colour variety in respect of their mass tone and can in many cases exhibit an angle-dependent change in colour (colour flop) due to interference.

The thickness of the metal oxide, metal oxide hydrate, metal suboxide, metal, metal fluoride, metal nitride, metal oxynitride layers or a mixture thereof on the support substrate is usually 3 to 1000 nm and, in the case of the metal oxide, metal oxide hydrate, metal suboxide, metal fluoride, metal nitride, metal oxynitrides or a mixture thereof, preferably 20 to 200 nm.

All effect pigments known to the person skilled in the art that are based on flake-form substrates comprising one or more layers, preferably metal oxide layers, are suitable so long as they have at least one titanium dioxide layer, preferably having a layer thickness of 20-500 nm, in particular 30-200 nm and very particularly preferably of 40-60 nm. The $TiO_2$ layer is preferably the outer layer on the base substrate. For the effect pigments according to the invention, however, all commercially available effect pigments can also be employed so long as they have at least one $TiO_2$ layer, in particular an outer $TiO_2$ layer.

The $TiO_2$ layer can be either in the rutile modification or in the anatase modification. The $TiO_2$ layer is preferably in the rutile modification. In a further embodiment, the $TiO_2$ layer may additionally also be doped, for example with niobium, zirconium, magnesium, calcium, strontium, barium, zinc, indium, tin, antimony.

Particularly preferred base pigments for the fluoride doping of the $TiO_2$ layer under mild reduction conditions have the following structure:

substrate+$TiO_2$ substrate+$SnO_2$+$TiO_2$
substrate+$TiO_2$+$SiO_2$+$TiO_2$
substrate+$SnO_2$+$TiO_2$+$SiO_2$+$SnO_2$+$TiO_2$
substrate+$TiO_2$+MgO+$TiO_2$
substrate+$SnO_2$+$TiO_2$+MgO+$SnO_2$+$TiO_2$
substrate+$TiO_2$+CaO+$TiO_2$
substrate+$SnO_2$+$TiO_2$+CaO+$SnO_2$+$TiO_2$
substrate+$TiO_2$+SrO+$TiO_2$
substrate+$SnO_2$+$TiO_2$+SrO+$SnO_2$+$TiO_2$
substrate+$TiO_2$+BaO+$TiO_2$
substrate+$SnO_2$+$TiO_2$+BaO+$SnO_2$+$TiO_2$
substrate+$TiO_2$+ZnO+$TiO_2$
substrate+$SnO_2$+$TiO_2$+ZnO+$SnO_2$+$TiO_2$ Very particularly preferred base pigments have the following layer structure:

natural mica flakes+$TiO_2$
natural mica flakes+$SnO_2$+$TiO_2$
natural mica flakes+$TiO_2$+$SiO_2$+$TiO_2$
natural mica flakes+$SnO_2$+$TiO_2$+$SiO_2$+$SnO_2$+$TiO_2$
natural mica flakes+$TiO_2$+MgO+$TiO_2$
natural mica flakes+$SnO_2$+$TiO_2$+MgO+$SnO_2$+$TiO_2$
natural mica flakes+$TiO_2$+CaO+$TiO_2$
natural mica flakes+$SnO_2$+$TiO_2$+CaO+$SnO_2$+$TiO_2$
natural mica flakes+$TiO_2$+SrO+$TiO_2$
natural mica flakes+$SnO_2$+$TiO_2$+SrO+$SnO_2$+$TiO_2$
natural mica flakes+$TiO_2$+BaO+$TiO_2$
natural mica flakes+$SnO_2$+$TiO_2$+BaO+$SnO_2$+$TiO_2$
natural mica flakes+$TiO_2$+ZnO+$TiO_2$
natural mica flakes+$SnO_2$+$TiO_2$+ZnO+$SnO_2$+$TiO_2$
synthetic mica flakes+$TiO_2$
synthetic mica flakes+$SnO_2$+$TiO_2$
synthetic mica flakes+$TiO_2$+$SiO_2$+$TiO_2$
synthetic mica flakes+$SnO_2$+$TiO_2$+$SiO_2$+$SnO_2$+$TiO_2$
synthetic mica flakes+$TiO_2$+MgO+$TiO_2$
synthetic mica flakes+$SnO_2$+$TiO_2$+MgO+$SnO_2$+$TiO_2$
synthetic mica flakes+$TiO_2$+CaO+$TiO_2$
synthetic mica flakes+$SnO_2$+$TiO_2$+CaO+$SnO_2$+$TiO_2$
synthetic mica flakes+$TiO_2$+SrO+$TiO_2$
synthetic mica flakes+$SnO_2$+$TiO_2$+SrO+$SnO_2$+$TiO_2$
synthetic mica flakes+$TiO_2$+BaO+$TiO_2$
synthetic mica flakes+$SnO_2$+$TiO_2$+BaO+$SnO_2$+$TiO_2$
synthetic mica flakes+$TiO_2$+ZnO+$TiO_2$
synthetic mica flakes+$SnO_2$+$TIO_2$+ZnO+$SnO_2$+$TiO_2$
$SiO_2$ flakes+$TiO_2$
$SiO_2$ flakes+$SnO_2$+$TiO_2$
$SiO_2$ flakes+$TiO_2$+$SiO_2$+$TiO_2$
$SiO_2$ flakes+$SnO_2$+$TiO_2$+$SiO_2$+$SnO_2$+$TiO_2$
$SiO_2$ flakes+$TiO_2$+MgO+$TiO_2$
$SiO_2$ flakes+$SnO_2$+$TiO_2$+MgO+$SnO_2$+$TiO_2$
$SiO_2$ flakes+$TiO_2$+CaO+$TiO_2$
$SiO_2$ flakes+$SnO_2$+$TiO_2$+CaO+$SnO_2$+$TiO_2$
$SiO_2$ flakes+$TiO_2$+SrO+$TiO_2$
$SiO_2$ flakes+$SnO_2$+$TiO_2$+SrO+$SnO_2$+$TiO_2$
$SiO_2$ flakes+$TiO_2$+BaO+$TiO_2$
$SiO_2$ flakes+$SnO_2$+$TiO_2$+BaO+$SnO_2$+$TiO_2$
$SiO_2$ flakes+$TiO_2$+ZnO+$TiO_2$
$SiO_2$ flakes+$SnO_2$+$TiO_2$+ZnO+$SnO_2$+$TiO_2$
$Al_2O_3$ flakes+$TiO_2$
$Al_2O_3$ flakes+$SnO_2$+$TiO_2$
$Al_2O_3$ flakes+$TiO_2$+$SiO_2$+$TiO_2$
$Al_2O_3$ flakes+$SnO_2$+$TiO_2$+$SiO_2$+$SnO_2$+$TiO_2$
$Al_2O_3$ flakes+$TiO_2$+MgO+$TiO_2$
$Al_2O_3$ flakes+$SnO_2$+$TiO_2$+MgO+$SnO_2$+$TiO_2$
$Al_2O_3$ flakes+$TiO_2$+CaO+$TiO_2$
$Al_2O_3$ flakes+$SnO_2$+$TiO_2$+CaO+$SnO_2$+$TiO_2$
$Al_2O_3$ flakes+$TiO_2$+SrO+$TiO_2$
$Al_2O_3$ flakes+$SnO_2$+$TiO_2$+SrO+$SnO_2$+$TiO_2$
$Al_2O_3$ flakes+$TiO_2$+BaO+$TiO_2$
$Al_2O_3$ flakes+$SnO_2$+$TiO_2$+BaO+$SnO_2$+$TiO_2$
$Al_2O_3$ flakes+$TiO_2$+ZnO+$TiO_2$
$Al_2O_3$ flakes+$SnO_2$+$TiO_2$+ZnO+$SnO_2$+$TiO_2$
glass flakes+$TiO_2$
glass flakes+$SnO_2$+$TiO_2$
glass flakes+$TiO_2$+$SiO_2$+$TiO_2$
glass flakes+$SnO_2$+$TiO_2$+$SiO_2$+$SnO_2$+$TiO_2$
glass flakes+$TiO_2$+MgO+$TiO_2$
glass flakes+$SnO_2$+$TiO_2$+MgO+$SnO_2$+$TiO_2$
glass flakes+$TiO_2$+CaO+$TiO_2$
glass flakes+$SnO_2$+$TiO_2$+CaO+$SnO_2$+$TiO_2$
glass flakes+$TiO_2$+SrO+$TiO_2$
glass flakes+$SnO_2$+$TiO_2$+SrO+$SnO_2$+$TiO_2$
glass flakes+$TiO_2$+BaO+$TiO_2$
glass flakes+$SnO_2$+$TiO_2$+BaO+$SnO_2$+$TiO_2$
glass flakes+$TiO_2$+ZnO+$TiO_2$
glass flakes+$SnO_2$+$TiO_2$+ZnO+$SnO_2$+$TiO_2$ "$TiO_2$" means a doped or undoped $TiO_2$ layer. The $TiO_2$ layer is preferably undoped. It is particularly preferably an undoped rutile layer.

The metal oxide layer(s) are preferably applied to the substrate flakes by wet-chemical methods, where the wet-chemical coating methods developed for the preparation of pearlescent pigments can be used; methods of this type are described, for example, in U.S. Pat. Nos. 3,087,828, 3,087,829, 3,553,001, DE 14 67 468, DE 19 59 988, DE 20 09 566, DE 22 14 545, DE 22 15 191, DE 22 44 298, DE 23 13 331, DE 25 22 572, DE 31 37 808, DE 31 37 809, DE 31 51 343, DE 31 51 354, DE 31 51 355, DE 32 11 602, DE 32 35 017, DE 196 18 568, EP 0 659 843, or also in further patent documents and other publications known to the person skilled in the art.

In the case of wet coating, the substrate flakes are suspended in water, and one or more hydrolysable metal salts are added at a pH which is suitable for hydrolysis, which is selected so that the metal oxides or metal oxide hydrates are precipitated directly onto the flakes without secondary precipitations occurring. The pH is usually kept constant by simultaneous metered addition of a base and/or acid. The effect pigments are subsequently separated off, washed and dried and optionally calcined, where the calcination temperature can be optimised in respect of the coating present in each case. In general, the calcination temperatures are between 250 and 1000° C., preferably between 350 and 900° C. If desired, the pigment can be separated off, dried and optionally calcined after the application of individual coatings and then resuspended again for the precipitation of the further layers.

For the application of an $SiO_2$ layer, the process described in DE 196 18 569 can be used. For the production of the $SiO_2$ layer, sodium water-glass solution or potassium water-glass solution is preferably employed.

Furthermore, the coating can also take place by gas-phase coating in a fluidised-bed reactor, where, for example, the processes proposed in EP 0 045 851 and EP 0 106 235 for the preparation of pearlescent pigments can be used correspondingly.

For the application of titanium dioxide, the process described in U.S. Pat. No. 3,553,001 is preferably employed. In this process, an aqueous solution of an inorganic titanium salt is slowly added to a suspension, heated to about 50-100° C., in particular 70-80° C., of the optionally already pre-coated substrates, and the pH is kept substantially constant at 0.5 to 5, in particular about 1.5 to 2.5, by simultaneous metered addition of a base. As soon as the desired layer thickness of the $TiO_2$ oxide hydrate has been reached, the addition of the titanium salt solution and the base is stopped. This process is also known as the titration process and has the special feature that there is no excess of titanium salt, but instead only such an amount per time unit is always provided as is necessary for uniform coating with the hydrated $TiO_2$ and also can be taken up by the surface of the substrate to be coated. No hydrated titanium dioxide particles are therefore present in the solution that are not deposited on the surface to be coated.

The hue of the pigments can be varied in broad limits by different choice of the coating amounts or the layer thicknesses resulting therefrom. Fine tuning for a certain hue can be achieved, beyond the pure choice of amount, by approaching the desired colour under visual or metrological control.

The fluoride doping of the $TiO_2$ layer on the base pigment is carried out by reducing the $TiO_2$ layer of the starting pigment simultaneously in the presence of a reducing agent and a fluoride donor. If the base pigment comprises a plurality of $TiO_2$ layers, the incorporation of the fluoride into the $TiO_2$ crystal lattice only takes place in the outer $TiO_2$ layer under reducing conditions. If doping with fluoride takes place at the anion positions in the $TiO_2$, this induces positive charge centres in the $TiO_2$ lattice structure, which in turn simplifies the reduction of $Ti^{4+}$ to $Ti^{3+}$, i.e. lower reduction temperatures are required than in the case of the reduction of $Ti^{4+}$ to $Ti^{3+}$ without the presence of a fluoride donor. Milder reduction conditions increase the homogeneity within the $Ti^{III+}$- and fluoride-doped $TiO_2$ layer and at the same time increase the reproducibility.

Suitable reducing agents are all solid reducing agents known to the person skilled in the art, such as, for example, alkaline-earth metals, B, Al, Si, Zn, Fe, LiH, $CaH_2$, $NaBH_4$, MgSi, $MgSi_2$, $Ca_2Si$, $CaSi_2$. The reducing agent employed is preferably Si. The proportion of reducing agent, based on the base pigment, is preferably 0.5-5% by weight, in particular 0.8-2% by weight and very particularly preferably 0.9-1.2% by weight.

Suitable fluoride donors are, for example, inorganic fluorides, such as, for example, $CaF_2$, $MgF_2$, NaF, $NH_4F$, organofluorine compounds, such as, for example, polytetrafluoroethylene, natural and synthetic fluorine-containing minerals, such as, for example, fluorophlogopite (=synthetic mica).

The proportion of fluoride donors, based on the base pigment, is preferably 0.01-3% by weight, in particular 0.01-1% by weight, very particularly preferably 0.03-0.3%.

The reduction reaction and doping are carried out in an inertising or reducing atmosphere, such as, for example, $N_2$, Ar, He, $CO_2$, CO, forming gas (for example 95:5 (v/v) $N_2$:$H_2$), $C_xH_y$, $H_2$, with $N_2$ or Ar being preferred.

The reduction is preferably carried out at temperatures of 700-1000° C., preferably 700-950° C., in particular 750-850° C., over a period of more than 10 minutes, preferably 15-60 minutes.

The reduction temperature can be lowered further by the presence of molten salts, such as, for example, alkali-metal/alkaline-earth metal halides, such as, for example, $CaCl_2$ or $MgCl_2$. The proportion of molten salts is preferably 0.01-5% by weight, in particular 0.01-3% by weight and very particularly preferably 0.03-1.5% by weight, based on the base pigment. However, the temperature cannot be reduced arbitrarily, since it is limited by the melting point of the added halide. Thus, for example, $CaCl_2$ melts at 772° C. and $MgCl_2$ at 714° C, i.e. the reduction temperature must be above the melting point of the molten salt.

In a particularly preferred embodiment, the reduction of the starting pigments is carried out with Si, CaF2 and CaCl2.

However, the reduction processes known from the prior art differ significantly in procedure from those in accordance with the present invention. The degree of doping is selected so that the final pigments comprise at least one fluoride-doped, reductively calcined titanium dioxide of the formula $TiF_yO_{2-x-y}$, where x and y are defined as follows:

$0.00001<y<0.05$, preferably $0.0001<y<0.01$ and particularly preferably $0.001<y<0.005$ and $0.00001<x<0.1$, particularly preferably $0.0001<x<0.03$.

The $TiO_2$ crystal structure is not changed by the doping with fluoride and $Ti^{3+}$, i.e. no titanium suboxide is present.

The present invention also relates to a process for the preparation of the effect pigments according to the invention which is distinguished in that effect pigments based on flake-form substrates which have at least one $TiO_2$ layer are reacted with at least one solid reducing agent in the presence of a fluoride donor and optionally at least one molten salt for 15-60 min in a non-oxidising gas atmosphere at temperatures of 700-900° C.

The degree of darkening due to reduction can be controlled both by the proportion of reducing agent and by the proportion of fluoride donor in the reaction mixture. However, the latter cannot be increased arbitrarily.

In order to increase the light, water and weather stability, it is frequently advisable to subject the effect pigment according to the invention to inorganic or organic post-coating or post-treatment, depending on the area of application. Post-coatings or post-treatments that come into consideration are, for example, the processes described in German Patent 22 15 191, DE-A 31 51 354, DE-A 32 35 017 or DE-A 33 34 598. This post-coating further increases the chemical and photochemical stability or simplifies handling of the effect pigment, in particular incorporation into various media. In order to improve the wettability, dispersibility and/or compatibility with the user media, functional coatings comprising $SiO_2$, $Al_2O_3$ or $ZrO_2$ or mixtures thereof can be applied to the pigment surface. Furthermore, organic post-coatings are possible, for example with silanes, as described, for example, in EP 0090259, EP 0 634 459, WO 99/57204, WO 96/32446, WO 99/57204, U.S. Pat. Nos. 5,759,255, 5,571,851, WO 01/92425 or in J. J. Ponjee, Philips Technical Review, Vol. 44, No. 3, 81 ff. and P. H. Harding, J. C. Berg, J. Adhesion Sci. Technol. Vol. 11, No. 4, pp. 471-493. Further examples of organic post-coatings can be found, for example, in EP 0 632 109, US 5,759,255, DE 43 17 019, DE 39 29 423, DE 32 35 017, EP 0 492 223, EP 0 342 533, EP 0 268 918, EP 0 141 174, EP 0 764 191, WO 98/13426 or EP 0 465 805, the disclosure content of which is hereby incorporated herein by way of reference. Pigments comprising an organic coating, for example comprising organosilanes or organotitanates or organozirconates, additionally, besides the optical properties already mentioned, exhibit increased stability to weathering influences, such as, for example, moisture and light, which is of particular interest, in particular, for industrial coatings and in the automobile sector. The stabilisation can be improved by inorganic components of the additional coating. The substances applied in this case merely comprise a proportion by weight of 0.1 to 5% by weight, preferably 0.5 to 3% by weight, of the entire effect pigment.

In total, the respective proportions for the additional stabilising coating should be selected so that the optical properties of the effect pigments according to the invention are only affected insignificantly or not at all.

The pigments according to the invention have a wide variety of applications. The present invention therefore likewise relates to the use of effect pigments in accordance with the present invention in cosmetics, paints, powder coatings, inks, plastics, films, in security printing, in security features in documents and identity papers, for laser marking, as electrostatically dissipative pigment, for colouring seed, for colouring foods or in medicament coatings and for the preparation of pigment preparations and dry preparations.

In the case of cosmetics, the effect pigments according to the invention are particularly suitable for products and formulations of decorative cosmetics, such as, for example, nail varnishes, colouring powders, lipsticks or eye shadows, soaps, toothpastes, etc. The effect pigments according to the invention can of course also be combined in the formulations with cosmetic raw materials and assistants of any type. These include, inter alia, oils, fats, waxes, film formers, preservatives and assistants which generally determine the applicational properties, such as, for example, thickeners and rheological additives, such as, for example, bentonites, hectorites, silicon dioxide, Ca silicates, gelatine, high-molecular-weight carbohydrates and/or surface-active assistants, etc. The formulations according to the invention comprising effect pigments can belong to the lipophilic, hydrophilic or hydrophobic type. In the case of heterogeneous formulations having discrete aqueous and non-aqueous phases, the particles according to the invention may be present in only one of the two phases in each case or also distributed over both phases.

The pH values of the aqueous formulations can be between 1 and 14, preferably between 2 and 11 and particularly preferably between 5 and 8. The concentrations of the effect pigments according to the invention in the formulation are not limited. They can be depending on the application—between 0.001 (rinse-off products, for example shower gels) and 99% (for example lustre-effect articles for particular applications). The effect pigments according to the invention may furthermore also be combined with cosmetic active compounds. Suitable active compounds are, for example, insect repellents, UV A/B/C protective filters (for example OMC, B3, MBC), anti-ageing active compounds, vitamins and derivatives thereof (for example vitamin A, C, E etc.), self-tanning agents (for example DHA, erythrulose, inter alia) and further cosmetic active compounds, such as, for example, bisabolol, LPO, ectoine, emblica, allantoin, bioflavonoids and derivatives thereof.

On use of the effect pigments in paints and inks, all areas of application known to the person skilled in the art are possible, such as, for example, powder coatings, automobile paints, printing inks for gravure, offset, screen or flexographic printing and for paints in outdoor applications. The paints and inks here can be, for example, radiation-curing, physically drying or chemically curing. For the preparation of printing inks or liquid paints, a multiplicity of binders are suitable, for example based on acrylates, methacrylates, polyesters, polyurethanes, nitrocellulose, ethylcellulose, polyamide, polyvinyl butyrate, phenolic resins, maleic resins, starch or polyvinyl alcohol, amino resins, alkyd resins, epoxy resins, polytetrafluoroethylene, polyvinylidene fluorides, polyvinyl chloride or mixtures thereof, in particular water-soluble types. The paints can be powder coatings or water- or solvent-based paints, where the choice of the paint constituents is subject to the general knowledge of the person skilled in the art. Common polymeric binders for powder coatings are, for example, polyesters, epoxides, polyurethanes, acrylates or mixtures thereof.

In addition, the effect pigments according to the invention can be used in films and plastics, for example in agricultural sheeting, infrared-reflective films and panes, gift films, plastic containers and mouldings for all applications known to the person skilled in the art. Suitable plastics are all common plastics for incorporation of the effect pigments according to the invention, for example thermosets, elastomers or thermoplastics. The description of the possible applications and the plastics, processing methods and additives which can be employed can be found, for example, in RD 472005 or in R. Glausch, M. Kieser, R. Maisch, G. Pfaff, J. Weitzel, Perlglanzpigmente [Pearlescent Pigments], Curt R. Vincentz Verlag, 1996, 83 ff., the disclosure content of which is also incorporated herein.

In addition, the effect pigments according to the invention are also suitable for use in security printing and in security-relevant features for, for example, forgery-proof cards and identity papers, such as, for example, entry tickets, personal identity papers, banknotes, cheques and cheque cards, and for other forgery-proof documents. In the area of agriculture, the effect pigments can be used for colouring seed and other starting materials, in addition in the foods sector for pigmenting foods. The effect pigments according to the invention can likewise be employed for the pigmentation of coatings in medicaments, such as, for example, tablets or dragees.

Since the usually silver-grey effect pigments according to the invention having a metallic lustre are, in contrast to aluminium pigments, transparent to electromagnetic radiation (20 MHz -100 GHz), these pigments are, in particular, also suitable for painting radar sensors or covers of radar sensors.

Preferred finishes, in particular for the industrial and automobile sector and agricultural machines, comprise 1-40% by weight, in particular 10-25% by weight, of the effect pigments according to the invention.

In the automobile sector, the effect pigments according to the invention are suitable both for metal finishes and also for plastic finishes, such as, for example, bumpers, radar sensors, radiator grilles, external mirrors, which is, in particular, of importance in order that the automobile has a uniform appearance on painting. Furthermore, it is also possible to prepare paint formulations with the pigments according to the invention for coating films which can likewise be employed in the automobile sector.

The effect pigments according to the invention can also be mixed in any ratio with, for example, aluminium pigments in order to achieve further colour effects. Depending on the mixing ratio, the pigment mixture is still transparent to electromagnetic radiation. For radar-transparent automobile finishes, the pigment mixture consisting of the effect pigments according to the invention and aluminium pigments should comprise not more than 0.1-5% by weight and preferably not more than 1-3% by weight of aluminium pigments.

For laser marking using the effect pigments according to the invention, all known thermoplastics, as described, for example, in Ullmann, Vol. 15, pp. 457 ff., Verlag VCH, can be used. Suitable plastics are, for example, polyethylene, polypropylene, polyamides, polyesters, polyester-esters, polyether-esters, polyphenylene ethers, polyacetal, polybutylene terephthalate, polymethyl acrylate, polyvinyl acetate, polystyrene, acrylonitrile-butadiene-styrene copolymers, acrylonitrile-styrene-acrylate copolymers, polycarbonate, polyether sulfones, polyether ketones, polyurethanes and copolymers and/or mixtures thereof. The effect pigments according to the invention are furthermore also suitable for incorporation into silicone rubber or silicone resins.

The effect pigments according to the invention are incorporated into the thermoplastic by mixing the plastic granules with the effect pigment and then shaping the mixture under the action of heat. Known adhesives, organic polymer-compatible solvents, stabilisers and/or surfactants which are temperature-stable under the working conditions, all of which are known to the person skilled in the art, can be added to the plastic granules on incorporation of the effect pigments. The pigmented plastic granules are generally prepared by initially introducing the plastic granules into a suitable mixer, wetting them with any additives and then adding and mixing in the effect pigment. The mixture obtained in this way can then be processed directly in an extruder or an injection-moulding machine. The marking is subsequently carried out using suitable radiation.

In particular, the silicone rubber is a silicone rubber which has been vulcanised at relatively low temperature (from room temperature to <200° C., two-component), which is known as RTV2 silicone, a silicone rubber which has been vulcanised at relatively high temperatures (from about 110° C., two-component, or from about 160° C., one-component), which is known as HTV silicone, or a silicone rubber which has been vulcanised in the liquid state (from about 110° C., two-component), which is known as LSR silicone. The effect pigment according to the invention is added to these one- or two-component silicone rubber components and homogeneously distributed therein. The mixture is then introduced, in accordance with requirements, into the cavity of an injection mould and vulcanised under suitable conditions. The conditions necessary for this purpose, such as temperature, pressure and reaction time, are known to the person skilled in the art and are selected in accordance with the starting materials and the desired final elastomers. In the case of one-component systems, the separate addition of a vulcanisation agent is not necessary. The vulcanisation process can be accelerated by the supply of actinic radiation, for example by UV or gamma radiation. The mixture obtained in this way is removed from the injection-moulding machine. The marking is subsequently carried out using suitable radiation.

The marking is preferably carried out using high-energy radiation, generally in the wavelength range from 157 to 10600 nm, in particular in the range from 300 to 10600 nm. For example, mention may be made here of $CO_2$ lasers (10600 nm), Nd:YAG lasers (1064 or 532 nm) or pulsed UV lasers (excimer lasers). The excimer lasers have the following wavelengths: $F_2$ excimer laser (157 nm), ArF excimer laser (193 nm), KrCl excimer laser (222 nm), KrF excimer laser (248 nm), XeCl excimer laser (308 nm), XeF excimer laser (351 nm), frequency-multiplied Nd:YAG-Laser with wavelengths of 355 nm (frequency-tripled) or 265 nm (frequency-quadrupled). Particular preference is given to the use of Nd:YAG lasers (1064 or 532 nm) and $CO_2$ lasers. The energy densities of the lasers employed are generally in the range from 0.3 mJ/cm$^2$ to 50 J/cm$^2$, preferably 0.3 mJ/cm$^2$ to 10 J/cm$^2$.

The laser inscription is carried out by introducing the specimen into the ray path of a pulsed laser, preferably of a $CO_2$ or Nd:YAG laser. Furthermore, inscription using an excimer laser, for example via a mask technique, is possible. However, the desired results can also be achieved using other conventional types of laser that have a wavelength in a region of high absorption of the laser light-absorbing substance used. The marking obtained is determined by the irradiation time (or pulse rate in the case of pulsed lasers) and irradiation power of the laser and the plastic system or paint system used. The power of the laser used depends on the particular application and can readily be determined in the individual case by the person skilled in the art.

On use of pulsed lasers, the pulse frequency is generally in the range from 1 to 30 kHz. Corresponding lasers which can be employed in the process according to the invention are commercially available.

The use of the effect pigments according to the invention for laser marking can be carried out in all above-mentioned plastics. The plastics pigmented in this way can be used as mouldings in the electrical, electronics and motor vehicle industries. A further important area of application for laser inscription are identity cards and plastic tags for the individual labelling of animals. The proportion of effect pigments in the plastic in the case of laser marking in the applications is 0.01 to 10% by weight, preferably 0.05 to 5% by weight and in particular 0.1 to 3% by weight. The labelling and inscription of housings, cables, key caps, trim or functional parts in the heating, ventilation and cooling sector or switches, plugs, levers and handles which consist of the plastics pigmented with the pigments according to the invention can be carried out with the aid of laser light even in poorly accessible areas. The markings are distinguished by the fact that they are wipe and scratch-resistant, stable during subsequent sterilisation processes and can be applied in a hygienically clean manner during the marking process.

It goes without saying that, for the various applications, the effect pigment according to the invention can also advantageously be employed in a mixture with, for example,

- metal-effect pigments, for example based on iron flakes or aluminium flakes;
- pearlescent pigments based on metal oxide-coated synthetic mica flakes, natural mica flakes, glass flakes, $Al_2O_3$ flakes, $Fe_2O_3$ flakes or $SiO_2$ flakes;
- absorption pigments;
- goniochromatic pigments;
- multilayered pigments (preferably comprising 2, 3, 4, 5 or 7 layers) based on metal oxide-coated synthetic mica flakes, natural mica flakes, glass flakes, $Al_2O_3$ flakes, $Fe_2O_3$ flakes or $SiO_2$ flakes;
- organic dyes;
- organic pigments;
- inorganic pigments, such as, for example, transparent and opaque white, coloured and black pigments; in particular temperature-stable ceramic pigments;
- flake-form iron oxides;
- carbon black;
- ceramic colour bodies;
- functional pigments, for example IR-reflective or electrically conductive pigments.

The effect pigment according to the invention can be mixed in any ratio with standard commercial pigments and/or further standard commercial fillers.

Fillers which may be mentioned are, for example, natural and synthetic mica, nylon powder, pure or filled melamine resins, talc, glasses, kaolin, oxides or hydroxides of aluminium, magnesium, calcium, zinc, BiOCl, barium sulfate, calcium sulfate, calcium carbonate, magnesium carbonate, carbon, and physical or chemical combinations of these substances. There are no restrictions regarding the particle shape of the filler. It can be, for example, flake-form, spherical or needle-shaped in accordance with requirements.

Formulations comprising the effect pigment according to the invention may furthermore comprise at least one constituent selected from the group absorbents, astringents, antimicrobial substances, antioxidants, antifoaming agents, antistatics, binders, biological additives, bleaches, chelating agents, deodorisers, emollients, emulsifiers, emulsion stabilisers, dyes, humectants, film formers, fillers, fragrances, flavours, insect repellents, preservatives, anticorrosion agents, cosmetic oils, solvents, oxidants, plant constituents, buffer substances, reducing agents, surfactants, propellant gases, opacifiers, UV filters, UV absorbers, denaturing agents, viscosity regulators, perfumes, vitamins, enzymes, trace elements, proteins, carbohydrates, organic pigments, inorganic pigments, such as, for example, $TiO_2$, carbon black, further effect pigments, metal pigments, such as, for example, aluminium pigments, effect pigments, metal-effect pigments.

The effect pigments according to the invention are furthermore suitable for the preparation of flowable pigment preparations and dry preparations comprising one or more particles according to the invention, binders and optionally one or more additives. Dry preparations are also taken to mean preparations which comprise 0 to 8% by weight, preferably 2 to 8% by weight, in particular 3 to 6% by weight, of water and/or a solvent or solvent mixture. The dry preparations are preferably in the form of pellets, granules, chips, sausages or briquettes and have particle sizes of 0.2-80 mm. The dry preparations are used, in particular, in the preparation of printing inks and in cosmetic formulations.

The complete disclosure content of all patent applications, patents and publications mentioned above is incorporated into this application by way of reference.

The following examples are intended to explain the invention in greater detail, but without limiting it.

EXAMPLES

Example 1

Comparative Example (Without F Doping)

Example 1a 30 g of Iriodin® 119 ($TiO_2$-coated mica flakes having a particle size distribution of 5-25 μm, Merck KGaA) and 0.34 g of Si powder (<100 μm; Merck KGaA), 0.23 g of fine $CaCl_2$ powder (<20 μm, Merck KGaA) and 0.45 g of talc (<15 μm, Mondo) are carefully mixed in a PP can in a Hauschild DAC 150 FVZ Speedmixer. The mixture is distributed uniformly in a quartz boat. The boat is placed in a quartz tube (internal diameter 5 cm, length 100 cm) which is provided on both sides with gas supply lines (ground joint-olive adapters). Nitrogen is blown through the reaction space at 55 l/h (1.75 bar) via one inlet and fed to the exhaust at the other end through a pair of wash bottles connected so that liquid cannot rise back into the oven. After 15 min., the tube is placed in the tubular oven in such a way that the boat is in the centre of the heating zone, which was regulated to a temperature of 850° C., and left there for 45 min. The tube is then removed from the oven and cooled in a stream of nitrogen for 30 min. The calcined powder is screened via a 40 μm sieve.

A silver-white effect pigment which does not exhibit a metallic lustre is obtained.

X-ray diffractograms before and after the calcination show that the crystallographic structure of the $TiO_2$ layer on the mica flake is not changed by the reductive calcination. The crystal structure of the $TiO_2$ layer is unchanged, i.e. no titanium suboxide is present.

Example 1b

Analogous to Example 1a, but the temperature is raised from 850° C. to 900° C.

Example 1c

Analogous to Example 1a, but the temperature is raised from 850° C. to 950° C.

TABLE 1

Comparative examples at various reaction temperatures:

| Example | Iriodin® 119 | Si | $CaCl_2$ | Talc | Temp. | Time | $N_2$ |
|---|---|---|---|---|---|---|---|
| 1a | 30 g | 0.34 g | 0.23 g | 0.45 g | 850° C. | 45 min | 55 l/h |
| 1b | 30 g | 0.34 g | 0.23 g | 0.45 g | 900° C. | 45 min | 55 l/h |
| 1c | 30 g | 0.34 g | 0.23 g | 0.45 g | 950° C. | 45 min | 55 l/h |

The effect pigments of Examples 1a, 1b and 1c all exhibit no or only slight hiding power and a metallic lustre is only evident from 950° C. However, the formation of undesired aggregates is observed at the same time with the high temperature.

Example 2

Doping with Fluoride from Various Precursors

Example 2a: Doping with $CaF_2$ 30 g of Iriodin® 119 ($TiO_2$-coated mica flakes having a particle size distribution of 5-25 μm, Merck KGaA), 0.34 g of Si powder (<100 μm; Merck KGaA), 0.23 g of $CaCl_2$ powder (<20 μm; Merck KGaA) and 0.45 g of talc (<15 μm, Mondo) and 0.1 g of $CaF_2$ powder (<20 μm, Merck KGaA) are carefully mixed in a PP can in a Hauschild DAC 150 FVZ Speedmixer. Instead of $CaF_2$, experiments can also be carried out with $MgF_2$ powder (Merck KGaA), NaF powder (Aldrich) and PTFE powder (35 μm, Aldrich).

If a fluoride-containing mica (fluorophlogopite, Merck KGaA) is used, the addition of talc can be omitted. The corresponding amounts are listed in Table 2. The mixture is distributed uniformly in a quartz boat. The boat is placed in a quartz tube (internal diameter 5 cm, length 100 cm) which is provided on both sides with gas supply lines (ground joint-olive adapters). Nitrogen is blown through the reaction space at 55 l/h (1.75 bar) via one inlet and fed to the exhaust at the other end through a pair of wash bottles connected so that liquid cannot rise back into the oven. After 15 min., the tube is placed in the tubular oven in such a way that the boat is in the centre of the heating zone, which was regulated to a temperature of 850° C. or 875° C., and left there for 45 min. The tube is then removed from the oven and cooled in a stream of nitrogen for 30 min. The calcined powder is screened via a 40 μm sieve.

Example 2b: Doping with $MgF_2$

Analogous to Example 2a, but 0.1 g of $MgF_2$ (Merck KGaA) is employed instead of 0.1 g of $CaF_2$.

Example 2c: Doping with NaF

Analogous to Example 2a, but 0.1 g of NaF (Aldrich) is employed instead of 0.1 g of $CaF_2$.

Example 2d: Doping with PTFE Powder

Analogous to Example 2a, but 0.1 g of polytetrafluoroethylene powder (35 μm, Aldrich) is employed instead of 0.1 g of CaF2.

Example 2e: Doping with Fluorophlogopite 30 g of Iriodin® 119 ($TiO_2$-coated mica flakes having a particle size distribution of 5-25 μm, Merck KGaA) 0.34 g of Si powder (<100 μm; Merck KGaA), 0.23 g of fine $CaCl_2$ powder (<20 μm; Merck KGaA) and 0.45 g of fluorophlogopite (particle size <15 µm, Merck KGaA) are carefully mixed in a PP can in a Hauschild DAC 150 FVZ Speedmixer. The corresponding amounts are listed in Table 2. The mixture is distributed uniformly in a quartz boat. The boat is placed in a quartz tube (internal diameter 5 cm, length 100 cm) which is provided on both sides with gas supply lines (ground joint-olive adapters). Nitrogen is blown through the reaction space at 55 l/h (1.75 bar) via one inlet and fed to the exhaust at the other end through a pair of wash bottles connected so that liquid cannot rise back into the oven. After 15 min., the tube is placed in the tubular oven in such a way that the boat is in the centre of the heating zone, which was regulated to a temperature of 850° C. or 875° C., and left there for 45 min. The tube is then removed from the oven and cooled in a stream of nitrogen for 30 min. The calcined powder is screened via a 40 µm sieve.

The pigments from Examples 2a-e exhibit a silver-grey metallic lustre and, with the exception of Example 2c, a significantly greater hiding power than Comparative Examples 1a-c, which are prepared at the same temperature. Even at 850° C., a hiding power is obtained for the pigments which the comparative examples have not yet reached even at 950° C., but significant aggregate formation is already observed. The pigment from Example 2d is significantly darker in appearance than the pigments from Examples 2a-c and 22. It is thus also possible to control the lightness of the pigments over a range which cannot be achieved with the approach chosen in Comparative Examples 1a-c without reducing the quality (aggregate formation).

TABLE 2

Examples with various F precursors (amounts, conditions):

| Example | Iriodin ® 119 | Si | $CaCl_2$ | Talc | F source/amount | Temp. | Time | $N_2$ |
|---|---|---|---|---|---|---|---|---|
| 2a | 30 g | 0.34 g | 0.23 g | 0.45 g | $CaF_2$/0.1 g | 850° C. | 45 min | 55 l/h |
| 2b | 30 g | 0.34 g | 0.23 g | 0.45 g | $MgF_2$/0.1 g | 850° C. | 45 min | 55 l/h |
| 2c | 30 g | 0.34 g | 0.23 g | 0.45 g | NaF/0.1 g | 875° C. | 45 min | 55 l/h |
| 2d | 30 g | 0.34 g | 0.23 g | 0.45 g | PTFE/0.1 g | 875° C. | 45 min | 55 l/h |
| 2e | 30 g | 0.26 g | 0.23 g | — | Fluorophlogopite/ 0.45 g | 850° C. | 45 min | 55 l/h |

Example 3

Temperature Variants with Fluorophlogopite 30 g of Iriodin® 119 ($TiO_2$-coated mica flakes having a particle size distribution of 5-25 µm; Merck KGaA) and 0.79 g of Si powder (<100 µm; Merck KGaA), 0.69 g of $CaCl_2$ powder (<20µm; Merck KGaA) and 1.35 g of ground fluorophlogopite (<15 µm, Merck KGaA) are carefully mixed in a PP can in a Hauschild DAC 150 FVZ Speedmixer. The mixture is distributed uniformly in a quartz boat. The boat is placed in a quartz tube (internal diameter 5 cm, length 100 cm) which is provided on both sides with gas supply lines (ground joint-olive adapters). Nitrogen is blown through the reaction space at 55 l/h (1.75 bar) via one inlet and fed to the exhaust at the other end through a pair of wash bottles connected so that liquid cannot rise back into the oven. After 15 min., the tube is placed in the tubular oven in such a way that the boat is in the centre of the heating zone, which was regulated to a temperature of 850° C., and left there for 45 min. The tube is then removed from the oven and cooled in a stream of nitrogen for 30 min. The calcined powder is screened via a 40 µm sieve.

Example 3b

Example 3a is repeated, but carried out at temperatures of 875° C.

Example 3c

Example 3a is repeated, but carried out at temperatures of 900° C.

Example 3d

Example 3a is repeated, but carried out at temperatures of 925° C.

TABLE 3

Example with higher reactant proportion at various reaction temperatures

| Example | Iriodin ® 119 | Si | $CaCl_2$ | Fluoro-phlogopite | Temp. | Time | $N_2$ |
|---|---|---|---|---|---|---|---|
| 3a | 30 g | 0.79 g | 0.69 g | 1.35 g | 850° C. | 45 min | 55 l/h |
| 3b | 30 g | 0.79 g | 0.69 g | 1.35 g | 875° C. | 45 min | 55 l/h |
| 3c | 30 g | 0.79 g | 0.69 g | 1.35 g | 900° C. | 45 min | 55 l/h |
| 3d | 30 g | 0.79 g | 0.69 g | 1.35 g | 925° C. | 45 min | 55 l/h |

Example 3 shows the influence of the temperature on the optical properties, in particular the metallic lustre. At temperatures of≥900° ° C., the metallic lustre is lost and a matt silver-grey effect pigment is obtained.

Example 4

Analogously to Examples 2e and 3a, variants are carried out with various proportions of silicon, calcium chloride and fluorophlogopite under otherwise identical reaction conditions and with the same work-up, as summarised in Table 4.

TABLE 4

Examples with various amounts of the reactants

| Example | Iriodin ® 119 | Si | $CaCl_2$ | Fluoro-phlogopite | Temp. | Time | $N_2$ |
|---|---|---|---|---|---|---|---|
| 4a | 30 g | 0.17 g | 0.12 g | 0.45 g | 850° C. | 45 min | 55 l/h |
| 4b | 30 g | 0.26 g | 0.23 g | 0.45 g | 850° C. | 45 min | 55 l/h |
| 4c | 30 g | 0.26 g | 0.23 g | 0.90 g | 850° C. | 45 min | 55 l/h |
| 4d | 30 g | 0.26 g | 0.23 g | 1.35 g | 850° C. | 45 min | 55 l/h |
| 4e | 30 g | 0.34 g | 0.23 g | 0.45 g | 850° C. | 45 min | 55 l/h |
| 4f | 30 g | 0.78 g | 0.69 g | 1.35 g | 850° C. | 45 min | 55 l/h |

Examples 4a to 4f each give silver-grey effect pigments having a metallic lustre and high hiding power. The pigments are very similar in lightness, but differ in the blue tinge. By contrast, the pigments prepared in accordance with Comparative Examples 1a-c rather exhibit a yellowish to eggshell-coloured hue. A cool blue hue is expected for metallic effect pigments.

Example 5

Effect Pigments with Variable $TiO_2$ Layer Thickness

Example 5a 30 g of Iriodin® 211 Fine Red ($TiO_2$-coated mica flakes having a particle size distribution of 5-25 μm which has a white mass tone with red reflections, Merck KGaA) and 0.26 g of Si powder (<100 μm; Merck KGaA), 0.46 g of $CaCl_2$ powder (<20 μm; Merck KGaA) and 0.45 g of ground fluorophlogopite (<15 μm, Merck KGaA) is carefully ground in a PP can in a Hauschild DAC 150 FVZ Speedmixer. The mixture is distributed uniformly in a quartz boat. The boat is placed in a quartz tube (internal diameter 5 cm, length 100 cm) which is provided on both sides with gas supply lines (ground joint-olive adapters). Nitrogen is blown through the reaction space at 55 l/h (1.75 bar) via one inlet and fed to the exhaust at the other end through a pair of wash bottles connected so that liquid cannot rise back into the oven. After 15 min., the tube is placed in the tubular oven in such a way that the boat is in the centre of the heating zone, which was regulated to a temperature of 925° C., and left there for 15 min. The tube is then removed from the oven and cooled in a stream of nitrogen for 30 min. The calcined powder is screened via a 40 μm sieve.

The pale green interference pigment gives an intensely blue-green effect pigment having grey absorption and a high hiding power.

Example 5b 30 g of Iriodin® 231 Fine Green ($TiO_2$-coated mica flakes having a particle size distribution of 5-25 μm, which has a white mass tone with green reflections, Merck KGaA) and 0.26 g of Si powder (<100 μm; Merck KGaA), 0.46 g of $CaCl_2$ powder (<20 μm; Merck KGaA) and 0.45 g of ground fluorophlogopite (<15 μm, Merck KGaA) is carefully ground in a PP can in a Hauschild DAC 150 FVZ Speedmixer. The mixture is distributed uniformly in a quartz boat. The boat is placed in a quartz tube (internal diameter 5 cm, length 100 cm) which is provided on both sides with gas supply lines (ground joint-olive adapters). Nitrogen is blown through the reaction space at 55 l/h (1.75 bar) via one inlet and fed to the exhaust at the other end through a pair of wash bottles connected so that liquid cannot rise back into the oven. After 15 min., the tube is placed in the tubular oven in such a way that the boat is in the centre of the heating zone, which was regulated to a temperature of 925° C., and left there for 15 min. The tube is then removed from the oven and cooled in a stream of nitrogen for 30 min. The calcined powder is screened via a 40 μm sieve.

A copper-coloured effect pigment having grey absorption and a high hiding power is obtained.

TABLE 5

Examples of $TiO_2$/mica effect pigments having various layer thicknesses:

| Example | Pigment | Si | $CaCl_2$ | Fluoro-phlogo-pite | Temper-ature | Time | $N_2$ |
|---|---|---|---|---|---|---|---|
| 5a | 30 g of Iriodin ® 211 | 0.26 g | 0.46 g | 0.45 g | 925° C. | 15 min | 55 l/h |
| 5b | 30 g of Iriodin ® 231 | 0.26 g | 0.46 g | 0.45 g | 925° C. | 15 min | 55 l/h |

Example 6

Example 6a 30 g of Colorstream® T10-02 Arctic Fire ($TiO_2$-coated $SiO_2$ flakes having a particle size distribution of 5-60 μm, Merck KGaA) and 0.26 g of Si powder (<100 μm; Merck KGaA), 0.46 g of $CaCl_2$ powder (<20 μm; Merck KGaA) and 0.45 g of ground fluorophlogopite (<15 μm, Merck KGaA) are mixed intensively. The mixture is distributed uniformly in a quartz boat. The boat is placed in a quartz tube (internal diameter 5 cm, length 100 cm) which is provided on both sides with gas supply lines (ground joint-olive adapters). Nitrogen is blown through the reaction space at 55 l/h (1.75 bar) via one inlet and fed to the exhaust at the other end through a pair of wash bottles connected so that liquid cannot rise back into the oven. After 15 min., the tube is placed in the tubular oven in such a way that the boat is in the centre of the heating zone, which was regulated to a temperature of 925° C., and left there for 30 min. The tube is then removed from the oven and cooled in a stream of nitrogen for 30 min. The calcined powder is screened via a 63 μm sieve.

The effect pigment obtained in this way exhibits a strong colour flop from lilac to pale green and a metallic lustre.

Example 6b

In addition, a darker variant is prepared using a larger amount of reactants, as indicated in the following table.

With a higher proportion of reactants, the effect pigment becomes significantly darker in appearance. The colour flop is then less pronounced.

TABLE 6

Examples with $SiO_2$ flakes as substrate

| Example | Pigment | Si | $CaCl_2$ | Fluoro-phlogo-pite | Temper-ature | Time | $N_2$ |
|---|---|---|---|---|---|---|---|
| 6a | 30 g of Color-stream ® T10-02 | 0.26 g | 0.46 g | 0.45 g | 925° C. | 15 min | 55 l/h |
| 6b | 30 g of Color-stream ® T10-02 | 0.79 g | 0.69 g | 1.35 g | 925° C. | 15 min | 55 l/h |

Example 7

Examples with Glass Flakes as Substrate

Example 7a 30 g of Miraval® 5311 Scenic White ($TiO_2$-coated glass flakes having a white mass tone and having a particle size distribution of 10-100 μm, Merck KGaA) and 0.79 g of Si powder (particle size<100 μm; Merck KGaA), 0.69 g of $CaCl_2$ powder (<20μm; Merck KGaA) and 1.35 g of ground fluorophlogopite (<15 μm, Merck KGaA) are carefully mixed in a PP can in a Hauschild DAC 150 FVZ Speedmixer. The mixture is distributed uniformly in a quartz boat. The boat is placed in a quartz tube (internal diameter 5 cm, length 100 cm) which is provided on both sides with gas supply lines (ground joint-olive adapters). Nitrogen is blown through the reaction space at 55 l/h (1.75 bar) via one inlet and fed to the exhaust at the other end through a pair of wash bottles connected so that liquid cannot rise back into the oven. After 15 min., the tube is placed in the tubular oven in such a way that the boat is in the centre of the heating zone, which was regulated to a temperature of 700° C., and left there for 45 min. The tube is then removed from the oven and cooled in a stream of nitrogen for 30 min. The calcined powder is screened via a 100 μm sieve.

Example 7b 30 g of Miraval® 5402 Pacific Twinkle ($TiO_2$-coated glass flakes having a white mass tone and having a particle size distribution of 10-100 μm, Merck KGaA)) and 0.79 g of Si powder (<100 μm; Merck KGaA), 0.69 g of $CaCl_2$ powder (<20 μm; Merck KGaA) and 1.35 g of ground fluorophlogopite (<15 μm, Merck KGaA) are carefully mixed in a PP can in a Hauschild DAC 150 FVZ Speedmixer. The mixture is distributed uniformly in a quartz boat. The boat is placed in a quartz tube (internal diameter 5 cm, length 100 cm) which is provided on both sides with gas supply lines (ground joint-olive adapters). Nitrogen is blown through the reaction space at 55 l/h (1.75 bar) via one inlet and fed to the exhaust at the other end through a pair of wash bottles connected so that liquid cannot rise back into the oven. After 15 min., the tube is placed in the tubular oven in such a way that the boat is in the centre of the heating zone, which was regulated to a temperature of 700° C., and left there for 45 min. The tube is then removed from the oven and cooled in a stream of nitrogen for 30 min. The calcined powder is screened via a 100 μm sieve.

The effect pigments from Examples 7a and 7b are darker in appearance compared with the base pigments; the silver pigment from Example 7a gets a discernible metallic character and the turquoise interference pigment from Example 7b becomes an intense blue effect pigment, although the calcination in both examples is only carried out at 700° C. in order to avoid destroying the temperature-sensitive glass flakes.

TABLE 7

| Example | Pigment | Si | $CaCl_2$ | Fluoro-phlogopite | Temper-ature | Time | $N_2$ |
|---|---|---|---|---|---|---|---|
| 7a | 30 g of Miraval ® 5311 | 0.79 g | 0.69 g | 1.35 g | 700° C. | 15 min | 55 l/h |
| 7b | 30 g of Miraval ® 5402 | 0.79 g | 0.69 g | 1.35 g | 700° C. | 15 min | 55 l/h |

Example 8

Examples with Synthetic Mica as Substrate

Example 8a 30 g of Iriodin® 6123 ($TiO_2$-coated synthetic mica flakes (=fluorophlogopite) having a particle size distribution of 5-25 μm, Merck KGaA) and 0.34 g of Si powder (<100 μm; Merck KGaA), 0.23 g of CaCl2 powder (<20 μm, Merck KGaA) and 0.45 g of talc (<15 μm, Mondo) are carefully mixed in a PP can in a Hauschild DAC 150 FVZ Speedmixer. Additional addition of a fluoride precursor is omitted owing to the fluorine-containing substrate (synthetic mica). The mixture is distributed uniformly in a quartz boat. The boat is placed in a quartz tube (internal diameter 5 cm, length 100 cm) which is provided on both sides with gas supply lines (ground joint-olive adapters). Nitrogen is blown through the reaction space at 55 l/h (1.75 bar) via one inlet and fed to the exhaust at the other end through a pair of wash bottles connected so that liquid cannot rise back into the oven. After 15 min. the tube is placed in the tubular oven in such a way that the boat is in the centre of the heating zone, which was regulated to a temperature of 850° C., and left there for 45 min. The tube is then removed from the oven and cooled in a stream of nitrogen for 30 min. The calcined powder is screened via a 40 μm sieve.

Example 8b

Example 8a is repeated with reduced use of reactants, as shown in Table 8.

Since the substrate comprising synthetic mica (=fluorophlogopite) itself contains a sufficient amount of fluoride ions, additional addition of fluoride precursor is not necessary. The pigment from Example 8a is even significantly darker than, for example, a physical mixture with pure fluorophlogopite, since the fluoride source is located in the interior of the pigment to be reduced. Example 8b with significantly reduced use of reactants therefore gives a pigment which is similar in lightness and hiding power to the pigments of Example 4.

TABLE 8

| Example | Pigment | Si | $CaCl_2$ | Talc | Temper-ature | Time | $N_2$ |
|---|---|---|---|---|---|---|---|
| 8a | 30 g of Iriodin ® 6123 | 0.34 g | 0.23 g | 0.45 g | 850° C. | 45 min | 55 l/h |
| 8b | 30 g of Iriodin ® 6123 | 0.17 g | 0.12 g | 0.23 g | 850° C. | 45 min | 55 l/h |

Example 9

Examples with $Al_2O_3$ Flakes as Substrate

Example 9a 30 g of Xirallic® Crystal Silver T50-10 ($TiO_2$-coated aluminium oxide flakes having a white mass tone and silver-white reflections and a particle size distribution of 15-22 μm, Merck KGaA), 0.34 g of Si powder (<100 μm; Merck KGaA), 0.23 g of $CaCl_2$ powder (<20 μm; Merck KGaA) and 0.45 g of Talk (<15 μm, Mondo) and 0.1 g of $CaF_2$ powder (<20 μm, Merck KGaA) are carefully mixed in a PP can in a Hauschild DAC 150 FVZ Speedmixer. Experiments are carried out with MgF2 (<20 μm, Merck KGaA) and fluorophlogopite (<15 μm, synthetic mica, Merck KGaA) instead of $CaF_2$. When fluorophlogopite is used, the addition of talc is omitted since, as a phyllosilicate, like talc, it improves the flowability of the mixture. The corresponding amounts are listed in the following table (9 a-c). The mixture is distributed uniformly in a quartz boat. The boat is placed in a quartz tube (internal diameter 5 cm, length 100 cm) which is provided on both sides with gas supply lines (ground joint-olive adapters). Nitrogen is blown through the reaction space at 55 l/h (1.75 bar) via one inlet and fed to the exhaust at the other end through a pair of wash bottles connected so that liquid cannot rise back into the oven. After 15 min,. the tube is placed in the tubular oven in such a way that the boat is in the centre of the heating zone, which was regulated to a temperature of 850° C., and left there for 45 min. The tube is then removed from the oven and cooled in a stream of nitrogen for 30 min. The calcined powder is screened via a 40 μm sieve.

The effect pigments from Examples 9a-c have a dark, metallic grey hue and exhibit the typical sparkle effect when aluminium oxide is used as substrate. In Examples 9a and 9b, a blue hue is clearly evident.

In a variant, 10 g of Xirallic® Crystal Silver T50-10 ($TiO_2$-coated aluminium oxide flakes having a particle size distribution of 15-22 μm, which have a white mass tone with silver-white reflections, Merck KGaA), 0.11 g of Si powder (<100 μm; Merck KGaA), 0.08 g of $CaCl_2$ powder (<20 μm; Merck KGaA) are carefully mixed in a PP can in a Hauschild DAC 150 FVZ Speedmixer and distributed in a uniform pile centrally in the quartz boat. 0.2 g of $CaF_2$ powder (<20 μm, Merck KGaA) is piled up on both the left and right in the quartz boat alongside the mixture at a separation of about 2 cm. The corresponding amounts are listed in the following table (Example 9e). In the control experiment (Example 9d) no $CaF_2$ is placed alongside the mixture. The boat is placed in a quartz tube (internal diameter 5 cm, length 100 cm) which is provided on both sides with gas supply lines (ground joint-olive adapters). Nitrogen is blown through the reaction space at 55 l/h (1.75 bar) via one inlet and fed to the exhaust at the other end through a pair of wash bottles connected so that liquid cannot rise back into the oven. After 15 min., the tube is placed in the tubular oven in such a way that the boat is in the centre of the heating zone, which was regulated to a temperature of 850° C., and left there for 30 min. The tube is then removed from the oven and cooled in a stream of nitrogen for 30 min.

Samples of the mixture of the untreated pigment from Examples 9d and 9e, the control experiment (without $CaF_2$) and the experiment with $CaF_2$ in the vicinity of the reaction mixture are taken, washed with distilled water and dried at 110° C. The samples prepared in this way are subjected to x-ray photoelectron spectroscopy (XPS) in order to determine the states of $Ti^{3+}$ and $F^-$ in the $TiO_2$ crystal lattice.

TABLE 9

Examples von $TiO_2$/aluminium oxide pigments with various F precursors (amounts, conditions.)

| Example | Xirallic ® Crystal Silver T50-10 | Si | $CaCl_2$ | Talc | F source/ amount | Temperature | Time | $N_2$ |
|---|---|---|---|---|---|---|---|---|
| 9a | 30 g | 0.34 g | 0.23 g | 0.45 g | $CaF_2$/0.1 g | 850° C. | 45 min | 55 l/h |
| 9b | 30 g | 0.34 g | 0.23 g | 0.45 g | $MgF_2$/0.1 g | 850° C. | 45 min | 55 l/h |
| 9c | 30 g | 0.34 g | 0.23 g | 0.45 g | Fluoro-phlogopite/ 0.45 g | 850° C. | 45 min | 55 l/h |
| 9d | 10 g | 0.11 g | 0.08 g | — | — | 850° C. | 30 min | 55 l/h |
| 9e | 10 g | 0.11 g | 0.08 g | — | $CaF_2$ (extra)/ 2 × 0.2 g | 850° C. | 30 min | 55 l/h |

The quantitative fluoride determination by combustion ion chromatography gives values of 540 to 935 ug of fluoride per 1 g of sample (corresponds to 0.003 to 0.005 at % of fluoride).

Example 10

Nb-Doped Titanium Oxide on Mica Flakes 30 g of $TiO_2$-coated mica flakes having a particle size distribution of 10-60 μm which have a white mass tone with bluish reflection at 700° C. in air, in which the titanium oxide has already been doped with 8 mol % of niobium during the synthesis by coprecipitation of a correspondingly mixed solution of $TiCl_4$ and $NbCl_5$ in HCl and deionised water, and 0.26 g of Si powder (<100 μm; Merck KGaA), 0.34 g of $CaCl_2$ powder (<20 μm; Merck KGaA) and 0.45 g of fluorophlogopite (<15 μm, synthetic mica, Merck KGaA) are carefully mixed in a PP can in a Hauschild DAC 150 FVZ Speedmixer. The mixture is distributed uniformly in a quartz boat. The boat is placed in a quartz tube (internal diameter 5 cm, length 100 cm) which is provided on both sides with gas supply lines (ground joint-olive adapters). Nitrogen is blown through the reaction space at 55 l/h (1.75 bar) via one inlet and fed to the exhaust at the other end through a pair of wash bottles connected so that liquid cannot rise back into the oven. After 15 min. the tube is placed in the tubular oven in such a way that the boat is in the centre of the heating zone, which was regulated to a temperature of 850° C., and left there for 45 min. The tube is then removed from the oven and cooled in a stream of nitrogen for 30 min. The calcined powder is screened via a 40 μm sieve.

As comparison, a sample of the Nb-doped $TiO_2$ pigment which has been dried at 110° C. for 18 h after the precipitation is calcined at 850° C. in air for 45 min. This calcined powder is likewise worked up via a 40 μm sieve.

TABLE 10

| Example | Pigment | Si | $CaCl_2$ | Fluoro-phlogopite | Temper-ature | Time | $N_2$ |
|---|---|---|---|---|---|---|---|
| 10a | 30 g | 0.34 g | 0.23 g | 0.45 g | 850° C. | 45 min | 55 l/h |
| 10b | 30 g | 0.17 g | 0.12 g | 0.23 g | 850° C. | 45 min | 55 l/h |

Example 11

Aftertreatment with Sodium Hydroxide Solution 250 g of effect pigment corresponding to Example 2a are suspended in about 2000 ml of deionised water (10-15 wt. %) and warmed to 70° C. with stirring at 900 $min^{-1}$. A PH of 11.0 is established over the course of 60 min using 32% sodium hydroxide solution. The pH is not kept constant, but continually re-adjusted over the course of the next 8 hours by metered addition of 32% sodium hydroxide solution. The suspension is filtered while still warm and rinsed with deionised water on the filter until the conductivity of the filtrate is less than 200 μS/cm.

At this point, the material can be dried at 90° C. for 16 hours or used directly as aqueous suspension for post-coating (cf. Example 13).

The product has not changed in colour, but is significantly finer and can be sieved better. A more uniform distribution of the pigments is evident in the paint card.

The graininess of a pigment paint application can be assessed using the BYK Instruments mac i multiangle colour and effect measurement instrument (byk-instruments.com). To this end, an image is generated in the instrument under diffuse illumination by means of a CCD chip and the corresponding bright/dark distribution is evaluated. A smaller graininess value describes more uniform surfaces. A graininess value of ≤2.5 has frequently proven advantageous in the applications. The graininess factor generally correlates very well with the optical and microscopic observations.

TABLE 11

Influence of graininess by treatment with hydroxide solution

| Example | Duration | Graininess (black) |
|---|---|---|
| 11a | 0 h | 2.66 |
| 11b | 3 h | 2.42 |
| 11c | 8 h | 2.18 |

Example 12

Physical Properties/Radar Transparency 30 g of Iriodin® 119 ($TiO_2$-coated mica flakes having a particle size distribution of 5-25 μm, Merck KGaA) or the same amount 30 g of Xirallic® Crystal Silver T50-10 ($TiO_2$-coated aluminium oxide flakes having a white mass tone and silver-white reflections and a particle size distribution of 15-22 μm, Merck KGaA), 0.34 g of Si powder (<100 μm; Merck KGaA), 0.23 g of $CaCl_2$ powder (<20 μm; Merck KGaA) and 0.45 g of talc (<15 μm, Mondo) and 0.1 g of $CaF_2$ powder (<20 μm, Merck KGaA) are carefully mixed in a PP can in a Hauschild DAC 150 FVZ Speedmixer. The corresponding amounts are listed in Table 11. The mixture is distributed uniformly in a quartz boat. The boat is placed in a quartz tube (internal diameter 5 cm, length 100 cm), which is provided on both sides with gas supply lines (ground joint-olive adapters). Nitrogen is blown through the reaction space at 55 l/h (1.75 bar) via one inlet and fed to the exhaust at the other end through a pair of wash bottles connected so that liquid cannot rise back into the oven. After 15 min., the tube is placed in the tubular oven in such a way that the boat is in the centre of the heating zone, which was regulated to a temperature of 850° C. or 875° C., and left there for 45 min. The tube is then removed from the oven and cooled in a stream of nitrogen for 30 min. The calcined powder is screened via a 40 μm sieve.

In order to be able to assess the radar transparency of the paint layer, a paint is prepared with 533.42 g of WBC 000 from MIPA (binder) and 16.17 g of pigment (18% PMC) and applied in 3 coats by means of pneumatic application to a 350 μm thick Hostaphan RN 350 PET film (A4 size) from Mitsubishi Polyester Film GmbH. The layer thickness of the film produced in this way is listed in Table 12.

As reference, both the uncoated PET film (Example 12h) and also a film coated with aluminium pigment (1:1 mixture of Stapa® IL Hydrolan 2156 and Stapa® IL Hydrolan 8154, Eckart), prepared in the same preparation (18% PMC) as described above, are measured.

The measurement of the permittivity of the coating and of the one-way transmission attenuation of the coating on the substrate is carried out using a model RMS-D-77/79G instrument from Perisens GmbH in standard mode.

Table 12 lists the permittivity (dielectric constant) and the one-way transmission attenuation (in dB) of a radar signal by the layer structure consisting of PET film and applied paint layer. Only a single passage of the radar beam is taken into account here.

The powder resistance is determined in a cylindrical, electrically insulating plastic measurement cell in which the powder sample is compacted between two electrically contacted rams with a 10 kg weight. The cell is filled so that a sample height of about 1 cm is obtained in the measurement cell after compaction. The height h in cm is determined from a graduation on the ram. The sample base area given by the dimensions of the ram with its diameter d=2 cm. The resistance R is measured using the 287 True RMS Multimeter measuring instrument from Fluke with a voltage of 1 V. This is used to calculate the specific powder resistance $\rho_s$.

$$\rho s = R^* \pi^* (d/2)^2 / h$$

TABLE 12

Synthesis examples for raising physical properties

| Example | Iriodin ® 119 | Si | $CaCl_2$ | Talc | $CaF_2$ | Temp. | Time | $N_2$ |
|---|---|---|---|---|---|---|---|---|
| 12a | 30 g of Iriodin ® 119 | 0.26 g | 0.23 g | 0.45 g | 0.1 g | 850° C. | 45 min | 55 l/h |
| 12b | 30 g of Iriodin ®119 | 0.34 g | 0.23 g | 0.45 g | 0.15 g | 850° C. | 45 min | 55 l/h |
| 12c | 30 g of Iriodin ® 119 | 0.26 g | 0.23 g | 0.45 g | 0.15 g | 875° C. | 45 min | 55 l/h |
| 12d | 30 g of Iriodin ® 119 | 0.34 g | 0.23 g | 0.45 g | 0.20 g | 875° C. | 45 min | 55 l/h |
| 12e | 30 g of Iriodin ® 119 | 0.51 g | 0.23 g | 0.45 g | 0.20 g | 850° C. | 45 min | 55 l/h |
| 12f | 30 g of Xirallic ® Crystal Silver T50-10 | 0.34 g | 0.23 g | 0.45 g | 0.1 g | 850° C. | 45 min | 55 l/h |
| 12g | 30 g of Xirallic ® Crystal Silver T50-10 | 0.67 g | 0.46 g | 0.45 g | 0.1 g | 850° C. | 45 min | 55 l/h |

TABLE 13

Physical properties of Examples 12a-i

| Example | Lightness L*15°, b | Spec. powder resistance | Layer thickness | Rel. permittivity at 76.5 GHZ | One-way transmission attenuation at 76.5 GHZ |
|---|---|---|---|---|---|
| 12a | 124.928 | $6.02*10^6$ ohm*cm | 13.26 μm | 5.318 | 1.20 dB |
| 12b | 123.158 | $4.08*10^6$ ohm*cm | 11.78 μm | 7.317 | 1.22 dB |

TABLE 13-continued

| Physical properties of Examples 12a-i | | | | | |
|---|---|---|---|---|---|
| Example | Lightness L*15°, b | Spec. powder resistance | Layer thickness | Rel. permittivity at 76.5 GHZ | One-way transmission attenuation at 76.5 GHZ |
| 12c | 120.274 | 4.11*10^6 ohm*cm | 12.73 μm | 7.017 | 1.21 dB |
| 12d | 118.367 | 1.28*10^6 ohm*cm | 11.89 μm | 8.297 | 1.25 dB |
| 12e | 100.143 | 2.15*10^4 ohm*cm | 12.00 μm | 8.272 | 1.25 dB |
| 12f | 102.292 | 9.64*10^6 ohm*cm | 11.88 μm | 7.402 | 1.20 dB |
| 12g | 59.4661 | 6.96*10^5 ohm*cm | 14.07 μm | 7.605 | 1.30 dB |
| 12h | — | — | — | 3.122 | 1.05 dB |
| 12i | 150.085 | — | 21.8 μm | 94.782 | 3.73 dB |

The examples all show a clear reduction in the attenuation of the radar signal on use of the mica- or aluminium oxide-based pigments (Examples 12a-g of) compared with the aluminium pigments (Comparative Example 12i). The usual quoting of the degree of attenuation in levels, power or fields in decibels (dB) means here for the case of aluminium pigmentation (Example 12i) a value of 3.73 dB, which describes the loss of more than 57% of the original power of the radar beam for a single passage. In the case of the pigments according to the invention (Examples 12a-g), by contrast, the attenuation is 1.20-1.30, which corresponds to a loss of less than 26% of the original power for a single passage. However, the PET support film also already has a proportion of 21.5% thereof with a one-way attenuation of 1.05. Pigmentation with the pigments according to the invention therefore makes a significant contribution to the achievement of radar-compatible paint formulations.

Example 13

After-Coating 150 g of effect pigment from Example 2a are suspended in 1350 ml of deionised water with stirring (=10% pigment suspension) at 700 $min^{-1}$ and room temperature. The temperature of the batch is adjusted to 75° C. (45 min).

After suspension of the pigment, a pH of 6.8 is established using sulfuric acid (5%), and the mixture is stirred for a further 15 minutes. If necessary, the pH is corrected using NaOH or $H_2SO_4$.

An aluminium chloride solution comprising 6.8 g of $AlCl_3$*6H2O (Merck KGaA) in 60 g of deionised water is metered in at a uniform rate, over the course of 120 min, at 75° C. using an Ismatec hose pump. During this addition, the pH is kept constant at 6.8 using sodium hydroxide solution (5%). Subsequent stirring time 10 minutes, keep pH at 6.80.

The pH is slowly (5 min) adjusted to pH 6.3 using a little $H_2SO_4$ (5%). Susequent stirring time 5 min, keep pH at 6.3.

A sodium water-glass solution diluted from 8.4 g of 27% sodium water-glass solution (Merck KGaA) and 60 g of deionised water is metered in at a uniform rate, over the course of 120 minutes, using an Ismatec hose pump. During this addition, the pH is kept constant at 6.3 using sulfuric acid (5%). Subsequent stirring time 20 minutes, keep pH at 6.30.

The pH is slowly adjusted to pH 8.0 using a little NaOH (5%). Subsequent stirring time 5 min, keep pH at 8.0.

The mixture of 3.0 g of 2-(3,4-epoxycyclohexyl)ethyltrimethoxysilane (ABCR; AB111130) and 3.0 g of 3-isocyanatopropyltriethoxysilane (ABCR; 111201) is added at a uniform rate over the course of 60 minutes at 75° C. and with stirring (700 $min^{-1}$) by means of a dropping funnel. The pH 8.0 is kept constant by metered addition of 5% sodium hydroxide solution. Subsequent stirring time 45 minutes without pH regulation. Heating and stirrer are switched off. The sample is allowed to settle.

The suspension is discharged directly onto a suction filter, filtered and washed in portions with 6×1 l of cold deionised water until the conductivity falls below a value of 30 μS/cm.

Finally, the product is dried by suction.

The pigment is subsequently dried for 16 hours with a small layer thickness (3-4 cm) in a porcelain dish in a fan-assisted drying cabinet which has been preheated to 150° C.

The dried product is sieved in portions through a Retsch sieve, mesh width 40 μm. The yield is 154 g of post-coated product.

The product has not changed in colour, but is significantly finer and free-flowing. A more uniform distribution of the pigments is evident in the paint card.

In the subsequent weathering test (SAEJ 2527) in paint systems from the paint manufacturers PPG and Axalta, the good stability of the material from Example 2 is evident with only slight shifts in chroma and hiding power after 2000 and 4000 hours.

Preparation of the Paint Card/Colour Measurement

In order to be able to assess the colorimetry of the pigments described in accordance with this invention, 0.9 g of each pigment sample is incorporated into 53.6 g of a nitrocellulose/acrylic resin paint and homogenised with the aid of a Speedmixer (Hauschild, 2 min, 2800 rpm) and freed from air bubbles. The pigment/paint mixture is applied to a black/white card in a 500 μm wet-film thickness using a paint applicator.

The cards are measured using a multiangle spectrophotometer (Byk Mac-i from Byk-Gardner). The following values are tabulated here:

L*15° b, a*15° b, b*15°b values for lightness, red-green and blue-yellow hue of the paint preparation (CIELAB colour space in accordance with EN ISO 11664-4); the values over the black card (b) measured at 15° from the specular angle are indicated here.

The less the difference is evident between the black and white backgrounds on the paint card, the more opaque is the pigment. ΔE(75°)=((L*75° b–L*75° w)^2+(a*75° b–a*75° w)^2+(b*75° b–b*75° w)^2)^0.5; colour separation as a measure of the hiding power measured over the corresponding parts of a paint preparation on a black/white card (b=black, w=white) at 75° back from the specular angle.

With the colour separation ΔE(75°)

$$\Delta E75° = \sqrt{(L^*75°, b - L^*75°, w)^2 + (a^*75°, b - a^*75°, w)^2 + (b^*75°, b - b^*75°, w)^2}$$

in the multi-angle spectrophotometer (FIG. 1), the difference in the appearance of a pigment preparation over a black background or white background can thus be indicated. If the pigment preparation were absolutely opaque, no difference would then be measurable either ΔE(75°)=0. The smaller the value for ΔE(75°), the more opaque is the preparation. In addition, the same conditions must always be set: same concentration of pigments, same film thickness, same light conditions (preferably also same measuring instrument). Pigments having a different structure (size, morphology) can only be compared to a limited extent.

TABLE 14

Result of the colour measurement of Examples 1-11

| Example | Colour impression (mass tone/interference) | L*15°, b | a*15°, b | b*15°, b | ΔE (75°) |
|---|---|---|---|---|---|
| 1a | silver-white | 130.794 | −1.5588 | 0.86179 | 33.0069 |
| 1b | pale silver-grey | 125.291 | −3.3362 | −2.9362 | 20.4397 |
| 1c | dark silver-grey, greenish | 95.638 | −6.3656 | −2.4150 | 16.4632 |
| 2a | metallic silver-grey, opaque | 121.075 | −5.4263 | −6.4909 | 14.1355 |
| 2b | metallic silver-grey, opaque | 122.681 | −5.0550 | −6.3456 | 14.0828 |
| 2c | pale silver-grey | 108.625 | −6.3109 | −8.5803 | 10.8327 |
| 2d | dark silver-grey, opaque, green-blue tinge | 128.170 | −3.0631 | −2.8897 | 21.8288 |
| 2e | metallic silver-grey | 128.818 | −3.2612 | −2.8564 | 16.7317 |
| 3a | dark silver-grey, lustrous | 109.128 | −5.8185 | −7.6113 | 16.3733 |
| 3b | dark silver-grey, lustrous | 103.134 | −5.9201 | −8.5930 | 13.0281 |
| 3c | dark silver-grey | 98.920 | −5.1996 | −7.8836 | 13.3533 |
| 3d | dark silver-grey, matt | 86.428 | −4.9152 | −7.3967 | 13.9626 |
| 4a | metallic silver-grey | 130.083 | −2.8079 | −2. 1474 | 22.6101 |
| 4b | metallic silver-grey | 128.818 | −3.2612 | −2.8564 | 16.7317 |
| 4c | metallic silver-grey | 124.734 | −4.1414 | −3.963 | 25.5664 |
| 4d | metallic silver-grey | 128.487 | −3.8098 | −3.0931 | 21.7965 |
| 4e | metallic silver-grey | 125.729 | −3.9067 | −4.5057 | 16.9368 |
| 4f | metallic silver-grey | 124.928 | −3.9414 | −3.9554 | 22.3764 |
| 5a | blue-green opaque with grey absorption | 83.577 | −32.7180 | −14.2921 | 27.8198 |
| 5b | copper-coloured with grey absorption | 84.921 | 21.2288 | 32.4789 | 30.1374 |
| 6a | strong flop from lilac to pale green | 114.996 | 23.6077 | −10.6120 | 46.4615 |
| 6b | dark grey with weak red lop | 66.612 | 15.2982 | −4.5213 | 20.6382 |
| 7a | silver-white, sparkling | 99.604 | −3.7759 | −12.789 | 68.8353 |
| 7b | blue, sparkling | 80.794 | −14.4830 | −40.565 | 73.4639 |
| 8a | dark grey, greenish | 75.222 | −3.5493 | −1.8886 | 18.7557 |
| 8b | metallic silver-grey | 117.047 | −4.6647 | −2.3193 | 24.5514 |
| 9a | dark grey, blue-tinged, sparkling | 53.506 | −1.6414 | −6.4517 | 29.8865 |
| 9b | dark grey, blue-tinged, sparkling | 59.525 | −2.7381 | −9.2656 | 29.0954 |
| 9c | dark metallic grey, sparkling | 100.972 | −4.0929 | −0.1547 | 36.3248 |
| 10a | blue interference, grey absorption | 78.095 | −16.7380 | −55.7210 | 73.5777 |
| 10b | turquoise interference, grey absorption | 129.652 | −1.5802 | 0.9810 | 32.9674 |
| 11a | metallic silver-grey | 121.786 | −4.7994 | −5.1356 | 16.7784 |
| 11b | metallic silver-grey | 122.029 | −4.8114 | −5.3089 | 16.1778 |
| 11c | metallic silver-grey | 122.321 | −4.8019 | −5.1034 | 14.5690 |
| 12a | metallic silver-grey | 124.928 | −3.94136 | −3.95538 | 23.4848 |
| 12b | metallic silver-grey | 123.158 | −5.2617 | −6.82431 | 12.9753 |
| 12c | metallic silver-grey | 120.274 | −5.51656 | −7.00471 | 16.3388 |
| 12d | metallic silver-grey, blue-tinged | 118.367 | −6.06488 | −8.3777 | 12.5019 |
| 12e | dark silver-grey, blue-tinged, opaque, | 100.143 | −6.67983 | −10.4283 | 10.1037 |
| 12f | pale metallic grey, sparkling | 102.292 | −4.8247 | 0.25455 | 36.5934 |
| 12g | dark metallic grey, sparkling | 59.4661 | −0.78445 | −2.58981 | 27.2185 |

TABLE 15

Colour measurement of the untreated pigments employed, for comparison

| Pigment | Colour (description) | L*15° b | a*15° b | b*15° b | ΔE (75°) |
|---|---|---|---|---|---|
| Iriodin ® 119 | colourless, silver-white | 135.148 | −1.2241 | 1.0278 | 33.0207 |
| Iriodin ® 231 | pale yellow-green, transparent | 102.539 | −29.2051 | 11.218 | 49.0022 |
| Iriodin ® 211 | pale red with slight blue tinge, transparent | 85.132 | 44.2422 | −2.2860 | 59.6073 |
| Colorstream T10-02 | strong flop from lilac to pale green | 119.698 | 19.7839 | −11.9320 | 47.9943 |
| Miraval ® 5311 | silver-white, sparkling | 96.373 | −3.6883 | −11.1713 | 72.1781 |
| Miraval ® 5402 | turquoise, sparkling | 84.996 | −29.2641 | −31.783 | 76.6108 |
| Iriodin ® 6123 | pale silver-white, transparent | 127.973 | −2.5298 | −1.5881 | 42.0532 |
| Xirallic ® T50-10 | colourless, silver-white, sparkling | 115.686 | −4.6650 | −3.0320 | 54.8363 |

Quantitative Determination of F:

Sample preparation/measurement: in each case, about 2 mg of the sample (6-fold determination) are weighed out into a quartz boat with sacrificial vial and burnt by means of CIC (combustion ion chromatography) in a stream of oxygen at oven temperatures of 1050° C. The gases are collected in an absorption solution ($H_2O_2$ solution), oxidised, and the anions are measured by means of IC.

The quantitative determination of fluoride by combustion ion chromatography gives values of 550 to 950 μg of fluoride per 1 g of sample (corresponds to 0.003 to 0.005 at % of fluoride).

TABLE 16

Results of the fluoride analysis

| | Fluoride doping (mean) | |
|---|---|---|
| Example | μg/g | at % |
| 2a | 714 | 0.0038 |
| 4b | 576 | 0.0030 |
| 4d | 910 | 0.0048 |

Use Examples (UE)

Example UE1

Automotive Paint

The pigment from Example 12 is stirred into the MIPA WBC 000 base paint (MIPA SE). Depending on the target shade, a certain amount of pigment is used. In order to produce a full tone, 2% by weight of the said pigment from Example 12 are utilised in the formulation. It may prove necessary to adjust the paint to a spray viscosity of 70-75 mPa·s at 1000 $s^{-1}$ by dilution with distilled water. The pigmented base paint is applied to black/white T21G metal panels from Leneta by spray coating. To this end, the automated Oerter APL 4.6 spray application with DeVilbiss $AGMD_{2616}$ spray gun (1.4 mm nozzle, 767c cap) is used. The spray pressure is 4200 mbar, the material flow rate is about 110 ml/min and the separation between spray gun and substrate is approximately 30 cm. The spray gun is moved at 0.45 m/s, with three layers being applied at a time separation of 30 seconds. The resultant dry-film thickness is 10-20 μm, preferably 11-15 μm. After pre-drying of the pigmented layer at room temperature with air circulation, a clear coat is applied over this base coat, and the complete coating is baked.

The panels exhibit a pale, silver-grey appearance with good hiding power and a strong light/dark effect on tilting.

Example UE2

Solvent-Based Gravure Printing on Cardboard 90 g of pigment from Example 12 are mixed with 200 g of Siegwerk NC TOB OPV 00 binder in an Engelsmann RRM Mini-II tumble mixer for 5 min. The mixture is subsequently homogenised with at least 125 g of a solvent mixture comprising ethanol and ethyl acetate 2:1 (v/v) using a Visco-Jet stirrer at 1200 rpm in order to adjust the viscosity. The viscosity is adjusted to an efflux time of 17 s (23° C.) in a DIN4 flow cup in which the same solvent mixture is made up to 200 g. The printing ink prepared in this way is used on standard commercial industrial printing machines with a gravure cylinder which has been engraved electrochemically with 70 lines/cm, intercell channels and transverse cells. Suitable substrates are both films and coated paper and coated cardboard. The result is, even on black cardboard, a uniformly opaque print image with sharp edges of pale silver-grey with a metallic appearance.

Example UE3

Plastic Granules for Injection Moulding 494 g of Purell GA 776 polyethylene (PE-HD) granules from Lyondell Basell are mixed with 1 g of Process Aid-24 from ColorMatrix (adhesion promoter) in an Engelsmann RRM Mini-II tumble mixer for 5 min, 5 g of pigment from Example 12 are then added and mixing is continued for a further 5 min. The dry mixture prepared in this way is used for the injection moulding of plastic sample tiles measuring 9*6*0.1 cm which exhibit the uniform, metallic-silver lustre of the example pigment.

Example UE4

Lipstick

| Phase | Wt. % | Name (ingredients) |
|---|---|---|
| A | 15.00% | Pigment from Example 4b |
| B | 10.60% | Bleached wax (*Cera alba*) |
| | 6.36% | Paracera C44 (Carnauba Wax - *Copernicia Cerifera*) |
| | 4.24% | Lanolin (*Adeps Lanae*) |
| | 6.78% | Isopropyl Myristate |
| | 2.55% | Thick paraffin (mineral oil-based) |
| | 0.06% | Oxynex ® K liquid (PEG-8, Tocopherol, Ascorbyl Palmitate, Ascorbic Acid, Citric Acid) |
| | 1.21% | Sensiva ® PA 20 (2-Phenylethanol, Ethylhexylglycerin) |
| | 53.00% | Castor Oil (*Ricinus Communis*) |
| C | 0.20% | Fragrance Tendresse #75418C (perfume) |

The constituents of phase B are heated to 75° C. and melted. The pigment (phase A) from Example 4b is added, and everything is combined well by stirring. The lipstick material is then stirred with the perfume from phase C in the casting apparatus, held at a temperature of 65° C., for 15 minutes. The homogeneous melt is poured into the casting moulds, which have been pre-warmed to 55° C. The moulds are subsequently cooled, and the castings are removed when cold.

The use example gives rise to a silver-coloured lipstick which is very opaque with a metallic lustre when applied.

Example UE5

Nail Varnish

| Raw material | Manufacturer | Composition (INCI) | % |
|---|---|---|---|
| Pigment Example 7b | Merck KGaA | — | 2.00 |
| Thixotropic nail varnish base 12898 | International Lacquers | Toluene, Ethyl Acetate, Butyl Acetate, Nitrocellulose, Tosylamide/Formaldehyde Resin, Dibutyl Phthalate, Isopropyl Alcohol, Stearalkonium Hectorite, Camphor, Acrylates Copolymer, Benzophenone-1 | 98.00 |

0.5 g of the pigment from Example 7b are weighed out together with 24.5 g of REF BASE 12898 nail varnish base from International Lacquers nailpolish&care, mixed well by hand using a spatula and subsequently homogenised for 4 min at 1200 rpm in a Hauschild DAC 150 FVZ Speed-mixer.

The invention claimed is:

1. An effect pigment based on a flake-form substrate, wherein the pigment comprises at least one $TiO_2$ layer in which the $TiO_2$ is doped with $Ti^{III+}$ and fluoride.

2. The effect pigment according to claim 1, wherein the flake-form substrate is selected from the group consisting of synthetic or natural mica flakes, phyllosilicates, glass flakes, $SiO_2$ flakes, $Al_2O_3$ flakes, $TiO_2$ flakes, graphite flakes and BiOCl flakes.

3. The effect pigment according to claim 2, wherein the synthetic mica flakes, glass flakes, $TiO_2$ flakes, $SiO_2$ flakes, and $Al_2O_3$ flakes are doped or undoped.

4. The effect pigment according to claim 1, wherein doping of the flake-form substrates is in an amount of 0.01-5% by weight, based on the substrate.

5. The effect pigment according to claim 1, wherein doping with $Ti^{III+}$ and fluoride in the $TiO_2$ layer is in an amount in accordance with the formula $TiF_yO_{2-x-y}$, wherein $0.00001<y<0.05$ and $0.0001<x<0.1$.

6. The effect pigment according to claim 1, wherein the pigment has a layer structure selected from:

substrate+$TiO_2$
substrate+$SnO_2$+$TiO_2$
substrate+$TiO_2$+$SiO_2$+$TiO_2$
substrate+$SnO_2$+$TiO_2$+$SiO_2$+$SnO_2$+$TiO_2$
substrate+$TiO_2$+MgO+$TiO_2$
substrate+$SnO_2$+$TiO_2$+MgO+$SnO_2$+$TiO_2$
substrate+$TiO_2$+CaO+$TiO_2$
substrate+$SnO_2$+$TiO_2$+CaO+$SnO_2$+$TiO_2$
substrate+$TiO_2$+SrO+$TiO_2$
substrate+$SnO_2$+$TiO_2$+SrO+$SnO_2$+$TiO_2$
substrate+$TiO_2$+BaO+$TiO_2$
substrate+$SnO_2$+$TiO_2$+BaO+$SnO_2$+$TiO_2$ substrate+$TiO_2$+ZnO+$TiO_2$ and substrate+$SnO_2$+$TiO_2$+ZnO+$SnO_2$+$TiO_2$, where at least one $TiO_2$ layer is doped with $Ti_{III+}$ and fluoride.

7. The effect pigment according to claim 1, wherein one or more $TiO_2$ layers of the effect pigment are additionally doped with one or more of niobium, zirconium, yttrium, magnesium, calcium, strontium, barium, zinc, indium and antimony.

8. The effect pigment according to claim 1, wherein the pigment is provided on a surface with an organic or inorganic coating as an outer layer.

9. A process for the preparation of the effect pigment according to claim 1, wherein an effect pigment based on a flake-form substrate comprising at least one $TiO_2$ layer is reacted in the presence of a fluoride donor and a solid reducing agent and optionally a molten salt in a reducing gas mixture at temperatures of 700-900° C.

10. The process according to claim 9, wherein the fluoride donor is selected from the group consisting of inorganic fluorides, organofluorine compounds, natural and synthetic fluorine-containing minerals.

11. The process according to claim 9, wherein the reducing agent is selected from the group consisting of alkaline-earth metals, B, Al, Si, Zn, Fe, LiH, $CaH_2$, $NaBH_4$, MgSi, $MgSi_2$, $Ca_2Si$, and $CaSi_2$.

12. A mixture of the effect pigment according to claim 1, with an organic or an inorganic dye and/or a pigment.

13. The mixture according to claim 12, wherein the pigment includes an aluminium pigment.

14. A formulation comprising the effect pigment according to claim 1.

15. The formulation according to claim 14, wherein the formulation is present in paints, powder coatings, inks, plastics, films, radar-transparent finishes, electrostatically dissipative formulations, radar sensor coatings, coloured seed, coloured foods, medicament coatings, pigment preparations, dry preparations and cosmetic formulations.

16. The formulation according to claim 14, further comprising at least one constituent selected from the group consisting of absorbents, astringents, antimicrobial substances, antioxidants, antifoaming agents, antistatics, binders, biological additives, bleaches, chelating agents, deodorisers, emollients, emulsifiers, emulsion stabilisers, dyes, humectants, film formers, fillers, fragrances, flavours, insect repellents, preservatives, anticorrosion agents, cosmetic oils, solvents, oxidants, plant constituents, buffer substances, reducing agents, surfactants, propellant gases, opacifiers, UV filters, UV absorbers, denaturing agents, viscosity regulators, perfumes, vitamins, enzymes, trace elements, proteins, carbohydrates, organic pigments, inorganic pigments, carbon black, effect pigments, metal pigments, and metal-effect pigments.

* * * * *